US011949462B2

(12) United States Patent
Gunzelmann et al.

(10) Patent No.: US 11,949,462 B2
(45) Date of Patent: Apr. 2, 2024

(54) ELECTRONIC DEVICES WITH HIGH FREQUENCY MULTIPLEXING CAPABILITIES

(71) Applicant: Apple Inc., Cupertino, CA (US)

(72) Inventors: Bertram R Gunzelmann, Koenigsbrunn (DE); Zdravko Boos, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/892,961

(22) Filed: Aug. 22, 2022

(65) Prior Publication Data

US 2023/0092606 A1 Mar. 23, 2023

Related U.S. Application Data

(60) Provisional application No. 63/246,739, filed on Sep. 21, 2021.

(51) Int. Cl.
*H04B 10/00* (2013.01)
*G02B 6/293* (2006.01)
(Continued)

(52) U.S. Cl.
CPC ....... *H04B 10/6164* (2013.01); *G02B 6/2938* (2013.01); *H04B 10/25759* (2013.01); *H04B 10/63* (2013.01)

(58) Field of Classification Search
CPC .............. H04B 10/27; H04B 10/2575; H04B 10/25752; H04B 10/25753;
(Continued)

(56) References Cited

U.S. PATENT DOCUMENTS 7,020,396 B2 * 3/2006 Izadpanah ................ H01Q 5/40
398/79
8,265,488 B2 * 9/2012 Davies ............... H04B 10/2575
398/128
(Continued)

OTHER PUBLICATIONS

Tara Fortier et al., 20 years of developments in optical frequency comb technology and applications, Communications Physics, 2019, pp. 1-16, National Institute of Standards and Technology, Boulder, CO, United States.
(Continued)

*Primary Examiner* — Hanh Phan
(74) *Attorney, Agent, or Firm* — Treyz Law Group, P.C.; Michael H. Lyons

(57) ABSTRACT

A communication system may an optical signal generator and a signal path. The generator may generate one or more optical local oscillator (LO) signals and an optical frequency comb. Optical paths and an optical demultiplexer may distribute the optical LO signal(s) and the frequency comb to photodiodes in one or more access points. The photodiodes may be coupled to antenna radiating elements. The optical paths may illuminate each photodiode using a signal pair that includes one of the optical LO signals and one of the carriers from the frequency comb. The photodiodes may convey wireless signals using the antenna radiating elements at frequencies given by the differences in frequency between the signals in the signal pairs. The radiating elements may concurrently convey the wireless signals with different external devices at different frequencies, with different devices at the same frequency, and/or with the same device at the same frequency.

20 Claims, 12 Drawing Sheets

(51) Int. Cl.
*H04B 10/2575* (2013.01)
*H04B 10/61* (2013.01)
*H04B 10/63* (2013.01)

(58) Field of Classification Search
CPC .......... H04B 10/25759; H04B 10/6164; H04B 10/40; H04B 10/63; H04J 14/023; H04J 14/0212; H04J 14/02; G02B 6/2938
USPC ....... 398/66, 67, 68, 69, 70, 71, 72, 79, 115, 398/116, 117, 135, 136, 158, 159, 202, 398/208, 76
See application file for complete search history.

(56) References Cited

U.S. PATENT DOCUMENTS

| 11,146,351 | B1* | 10/2021 | Xu | ..................... | H04B 10/2575 |
| 2002/0012495 | A1* | 1/2002 | Sasai | ................ | H04B 10/25754 |
| | | | | | 385/24 |
| 2019/0319356 | A1* | 10/2019 | Shi | .......................... | H01Q 5/22 |

OTHER PUBLICATIONS

Toshiyuki Inoue et al., Millimeter-Wave Wireless Signal Generation and Detection Using Photonic Technique for Mobile Communication Systems, 2016 IEEE International Topical Meeting on Microwave Photonics (MWP), 2016, pp. 55-58, IEEE, New York, NY, United States.

\* cited by examiner

ELECTRONIC DEVICES WITH HIGH FREQUENCY MULTIPLEXING CAPABILITIES

This application claims the benefit of U.S. Provisional Patent Application No. 63/246,739, filed Sep. 21, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. In addition, it is often desirable for the electronic device to be able to communicate with multiple external devices at once.

SUMMARY

A wireless communication system may include one or more electronic devices that wirelessly communicate with one or more external devices. The system may include a central optical controller with an optical signal generator. The optical signal generator may generate an optical local oscillator (LO) signal or a set of optical LO signals that are evenly spaced by a frequency gap. The optical signal generator may also generate an optical frequency comb that is offset in frequency from the optical LO signal(s). The optical frequency comb may include a set of carriers (tones) that are evenly spaced by the frequency gap.

Optical paths and an optical demultiplexer may distribute the optical LO signal(s) and the optical frequency comb to photodiodes in one or more access points. The photodiodes may be coupled to antenna radiating elements. The optical paths may illuminate each photodiode using a signal pair that includes one of the optical LO signals and one of the carriers from the optical frequency comb. This may configure the photodiodes to convey wireless signals using the antenna radiating elements at frequencies given by the differences in frequency between the signals in the signal pairs. The wireless signals may be conveyed at frequencies greater than 100 GHz. The antenna radiating elements may concurrently convey the wireless signals with different external devices at different frequencies, with different devices at the same frequency (e.g., using different data streams), and/or with the same device at the same frequencies. Driving the photodiodes using portions of an optical frequency comb may minimize the size, cost, complexity, and power consumption of the central optical controller.

An aspect of the disclosure provides a communication system. The communication system can include an optical signal generator configured to generate an optical local oscillator (LO) signal and an optical frequency comb that is offset in frequency from the optical LO signal. The communication system can include an optical modulator configured to modulate wireless data onto the optical frequency comb. The communication system can include an antenna radiating element. The communication system can include a photodiode coupled to the antenna radiating element. The communication system can include an optical path configured to illuminate the photodiode with the optical LO signal and a portion of the optical frequency comb. The photodiode can be configured to generate, based on the optical LO signal, the portion of the optical frequency comb, and a bias voltage applied to the photodiode, a current at a frequency greater than or equal to 100 GHz on the antenna radiating element. The current on the antenna radiating element can be configured to radiate wireless signals that include at least some of the wireless data.

An aspect of the disclosure provides a method of operating a communication system. The method can include with an optical signal generator, generating a first optical local oscillator (LO) signal and a set of evenly spaced optical carriers that are offset from the first optical LO signal. The method can include with an optical modulator, modulating wireless data onto the set of evenly spaced optically carriers to produce a set of evenly spaced modulated optical carriers. The method can include with an optical fiber, conveying the first optical LO signal and the set of evenly spaced modulated optical carriers to an optical demultiplexer. The method can include with the optical demultiplexer, demultiplexing the set of evenly spaced modulated optical carriers and providing the first optical LO signal and a first modulated optical carrier from the set of evenly spaced modulated optical carriers to a first photodiode. The method can include with the first photodiode, transmitting first wireless signals at a first frequency greater than 100 GHz over a first antenna radiating element using the first optical LO signal and the first modulated optical carrier.

An aspect of the disclosure provides an electronic device. The electronic device can include an optical signal generator configured to generate an optical local oscillator (LO) signal and a set of optical tones that are evenly spaced in frequency and that are offset in frequency from the optical LO signal, the set of optical tones having at least a first optical tone and a second optical tone. The electronic device can include a first photodiode coupled to a first antenna radiating element. The electronic device can include a second photodiode coupled to a second antenna radiating element. The electronic device can include an optical splitter coupled to the optical signal generator through a first optical path, coupled to the first photodiode over a second optical path, and coupled to the second photodiode over a third optical path. The optical splitter can be configured to transmit the optical LO signal and the first optical tone to the first photodiode and being configured to transmit the optical LO signal and the second optical tone to the second photodiode. The first photodiode and the first antenna radiating element can be configured to convey first wireless signals at a first frequency greater than 100 GHz using the optical LO signal and the first optical tone. The second photodiode and the second antenna radiating element can be configured to convey second wireless signals at a second frequency that is different from the first frequency using the optical LO signal and the second optical tone.

DETAILED DESCRIPTION

Figure 1:
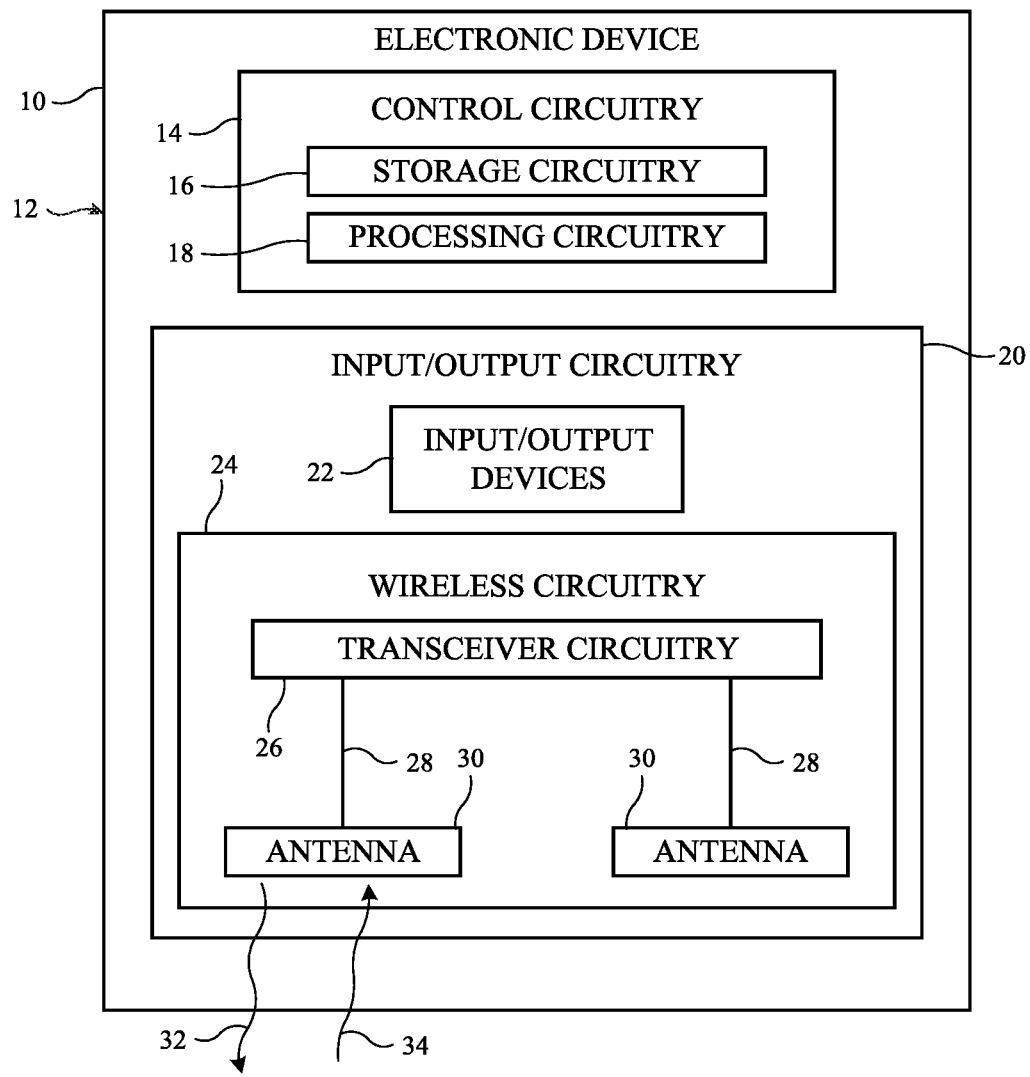
FIG. 1 is a block diagram of an illustrative electronic device having wireless circuitry with at least one antenna that conveys wireless signals at frequencies greater than about 100 GHz in accordance with some embodiments.

Electronic device 10 of FIG. 1 (sometimes referred to herein as electro-optical device 10) may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas 30.

Wireless circuitry 24 may also include transceiver circuitry 26. Transceiver circuitry 26 may include transmitter circuitry, receiver circuitry, modulator circuitry, demodulator circuitry (e.g., one or more modems), radio-frequency circuitry, one or more radios, intermediate frequency circuitry, optical transmitter circuitry, optical receiver circuitry, optical light sources, other optical components, baseband circuitry (e.g., one or more baseband processors), amplifier circuitry, clocking circuitry such as one or more local oscillators and/or phase-locked loops, memory, one or more registers, filter circuitry, switching circuitry, analog-to-digital converter (ADC) circuitry, digital-to-analog converter (DAC) circuitry, radio-frequency transmission lines, optical fibers, and/or any other circuitry for transmitting and/or receiving wireless signals using antennas 30. The components of transceiver circuitry 26 may be implemented on one integrated circuit, chip, system-on-chip (SOC), die, printed circuit board, substrate, or package, or the components of transceiver circuitry 26 may be distributed across two or more integrated circuits, chips, SOCs, printed circuit boards, substrates, and/or packages.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of wireless circuitry 24. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

Transceiver circuitry 26 may be coupled to each antenna 30 in wireless circuitry 24 over a respective signal path 28. Each signal path 28 may include one or more radio-frequency transmission lines, waveguides, optical fibers, and/or any other desired lines/paths for conveying wireless signals between transceiver circuitry 26 and antenna 30. Antennas 30 may be formed using any desired antenna structures for conveying wireless signals. For example, antennas 30 may include antennas with resonating elements that are formed from dipole antenna structures, planar dipole antenna structures (e.g., bowtie antenna structures), slot antenna structures, loop antenna structures, patch antenna structures, inverted-F antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time.

If desired, two or more of antennas 30 may be integrated into a phased antenna array (sometimes referred to herein as a phased array antenna) in which each of the antennas conveys wireless signals with a respective phase and magnitude that is adjusted over time so the wireless signals constructively and destructively interfere to produce (form) a signal beam in a given pointing direction. The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may transmit and/or receive wireless signals within corresponding frequency bands of the electromagnetic spectrum (sometimes referred to herein as communications bands or simply as "bands"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than 100 GHz.

As shown in FIG. 1, wireless circuitry 24 may transmit wireless signals 32 and may receive wireless signals 34 at frequencies greater than around 100 GHz. Wireless signals 32 and 34 may sometimes be referred to herein as tremendously high frequency (THF) signals 32 and 34, sub-THz signals 32 and 34, THz signals 32 and 34, or sub-millimeter wave signals 32 and 34. THF signals 32 and 34 may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 300 GHz and 10 THz, between 100 GHz and 800 GHz, between 200 GHz and 1.5 THz, etc. (e.g., within a sub-THz, THz, THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

Space is at a premium within electronic devices such as device 10. In some scenarios, different antennas 30 are used to transmit THF signals 32 than are used to receive THF signals 34. However, handling transmission of THF signals 32 and reception of THF signals 34 using different antennas 30 can consume an excessive amount of space and other resources within device 10 because two antennas 30 and signal paths 28 would be required to handle both transmission and reception. To minimize space and resource consumption within device 10, the same antenna 30 and signal path 28 may be used to both transmit THF signals 32 and to receive THF signals 34. If desired, multiple antennas 30 in wireless circuitry 24 may transmit THF signals 32 and may receive THF signals 34. The antennas may be integrated into a phased antenna array that transmits THF signals 32 and that receives THF signals 34 within a corresponding signal beam oriented in a selected beam pointing direction.

It can be challenging to incorporate components into wireless circuitry 24 that support wireless communications at these high frequencies. If desired, transceiver circuitry 26 and signal paths 28 may include optical components that convey optical signals to support the transmission of THF signals 32 and the reception of THF signals 34 in a space and resource-efficient manner. The optical signals may be used in transmitting THF signals 32 at THF frequencies and in receiving THF signals 34 at THF frequencies.

Figure 2:
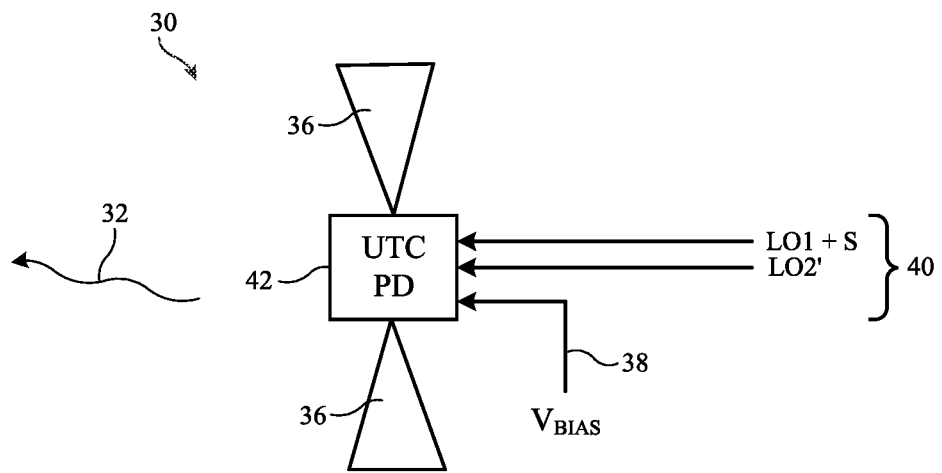
FIG. 2 is a top view of an illustrative antenna that transmits wireless signals at frequencies greater than about 100 GHz based on optical local oscillator (LO) signals in accordance with some embodiments.

FIG. 2 is a diagram of an illustrative antenna 30 that may be used to both transmit THF signals 32 and to receive THF signals 34 using optical signals. Antenna 30 may include one or more antenna radiating (resonating) elements such as radiating (resonating) element arms 36. In the example of FIG. 2, antenna 30 is a planar dipole antenna (sometimes referred to as a "bowtie" antenna) having two opposing radiating element arms 36 (e.g., bowtie arms or dipole arms). This is merely illustrative and, in general, antenna 30 may be any type of antenna having any desired antenna radiating element architecture.

As shown in FIG. 2, antenna 30 includes a photodiode (PD) 42 coupled between radiating element arms 36. Electronic devices that include antennas 30 with photodiodes 42 such as device 10 may sometimes also be referred to as electro-optical devices (e.g., electro-optical device 10). Photodiode 42 may be a programmable photodiode. An example in which photodiode 42 is a programmable uni-travelling-carrier photodiode (UTC PD) is described herein as an example. Photodiode 42 may therefore sometimes be referred to herein as UTC PD 42 or programmable UTC PD 42. This is merely illustrative and, in general, photodiode 42 may include any desired type of adjustable/programmable photodiode or component that converts electromagnetic energy at optical frequencies to current at THF frequencies on radiating element arms 36 and/or vice versa. Each radiating element arm 36 may, for example, have a first edge at UTC PD 42 and a second edge opposite the first edge that is wider than the first edge (e.g., in implementations where antenna 30 is a bowtie antenna). Other radiating elements may be used if desired.

UTC PD 42 may have a bias terminal 38 that receives one or more control signals $V_{BIAS}$. Control signals $V_{BIAS}$ may include bias voltages provided at one or more voltage levels and/or other control signals for controlling the operation of UTC PD 42 such as impedance adjustment control signals for adjusting the output impedance of UTC PD 42. Control circuitry 14 (FIG. 1) may provide (e.g., apply, supply, assert, etc.) control signals $V_{BIAS}$ at different settings (e.g., values, magnitudes, etc.) to dynamically control (e.g., program or adjust) the operation of UTC PD 42 over time. For example, control signals $V_{BIAS}$ may be used to control whether antenna 30 transmits THF signals 32 or receives THF signals 34. When control signals $V_{BIAS}$ include a bias voltage asserted at a first level or magnitude, antenna 30 may be configured to transmit THF signals 32. When control signals $V_{BIAS}$ include a bias voltage asserted at a second level or magnitude, antenna 30 may be configured to receive THF signals 34. In the example of FIG. 2, control signals $V_{BIAS}$ include the bias voltage asserted at the first level to configure antenna 30 to transmit THF signals 32. If desired, control signals $V_{BIAS}$ may also be adjusted to control the waveform of the THF signals (e.g., as a squaring function that preserves the modulation of incident optical signals, a linear function, etc.), to perform gain control on the signals conveyed by antenna 30, and/or to adjust the output impedance of UTC PD 42.

As shown in FIG. 2, UTC PD 42 may be optically coupled to optical path 40. Optical path 40 may include one or more optical fibers or waveguides. UTC PD 42 may receive optical signals from transceiver circuitry 26 (FIG. 1) over optical path 40. The optical signals may include a first optical local oscillator (LO) signal LO1 and a second optical local oscillator signal LO2. Optical local oscillator signals LO1 and LO2 may be generated by light sources in transceiver circuitry 26 (FIG. 1). Optical local oscillator signals LO1 and LO2 may be at optical wavelengths (e.g., between 400 nm and 700 nm), ultra-violet wavelengths (e.g., near-ultra-violet or extreme ultraviolet wavelengths), and/or infrared wavelengths (e.g., near-infrared wavelengths, mid-infrared wavelengths, or far-infrared wavelengths). Optical local oscillator signal LO2 may be offset in wavelength from optical local oscillator signal LO1 by a wavelength offset X. Wavelength offset X may be equal to the wavelength of the THF signals conveyed by antenna 30 (e.g., between 100 GHz and 1 THz (1000 GHz), between 100 GHz and 2 THz, between 300 GHz and 800 GHz, between 300 GHz and 1 THz, between 300 and 400 GHz, etc.).

During signal transmission, wireless data (e.g., wireless data packets, symbols, frames, etc.) may be modulated onto optical local oscillator signal LO2 to produce modulated optical local oscillator signal LO2'. If desired, optical local oscillator signal LO1 may be provided with an optical phase shift S. Optical path 40 may illuminate UTC PD 42 with optical local oscillator signal LO1 (plus the optical phase shift S when applied) and modulated optical local oscillator signal LO2'. If desired, lenses or other optical components may be interposed between optical path 40 and UTC PD 42 to help focus the optical local oscillator signals onto UTC PD 42.

UTC PD 42 may convert optical local oscillator signal LO1 and modulated local oscillator signal LO2' (e.g., beats between the two optical local oscillator signals) into antenna currents that run along the perimeter of radiating element arms 36. The frequency of the antenna currents is equal to the frequency difference between local oscillator signal LO1 and modulated local oscillator signal LO2'. The antenna currents may radiate (transmit) THF signals 32 into free space. Control signal $V_{BIAS}$ may control UTC PD 42 to convert the optical local oscillator signals into antenna currents on radiating element arms 36 while preserving the modulation and thus the wireless data on modulated local oscillator signal LO2' (e.g., by applying a squaring function to the signals). THF signals 32 will thereby carry the modulated wireless data for reception and demodulation by external wireless communications equipment.

Figure 3:
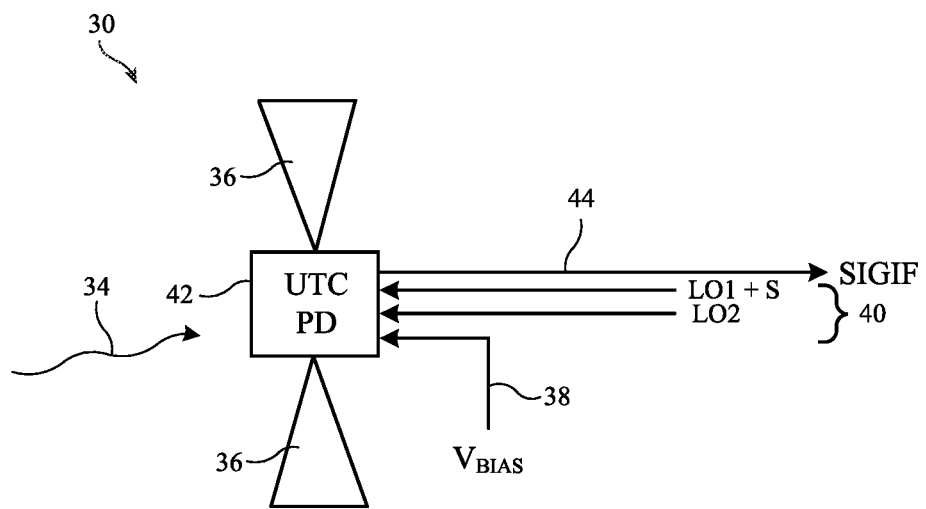
FIG. 3 is a top view showing how an illustrative antenna of the type shown in FIG. 2 may convert received wireless signals at frequencies greater than about 100 GHz into intermediate frequency signals based on optical LO signals in accordance with some embodiments.

FIG. 3 is a diagram showing how antenna 30 may receive THF signals 34 (e.g., after changing the setting of control signals $V_{BIAS}$ into a reception state from the transmission state of FIG. 2). As shown in FIG. 3, THF signals 34 may be incident upon antenna radiating element arms 36. The incident THF signals 34 may produce antenna currents that flow around the perimeter of radiating element arms 36. UTC PD 42 may use optical local oscillator signal LO1 (plus the optical phase shift S when applied), optical local oscillator signal LO2 (e.g., without modulation), and control signals $V_{BIAS}$ (e.g., a bias voltage asserted at the second level) to convert the received THF signals 34 into intermediate frequency signals SIGIF that are output onto intermediate frequency signal path 44.

The frequency of intermediate frequency signals SIGIF may be equal to the frequency of THF signals 34 minus the difference between the frequency of optical local oscillator signal LO1 and the frequency of optical local oscillator signal LO2. As an example, intermediate frequency signals SIGIF may be at lower frequencies than THF signals 32 and 34 such as centimeter or millimeter wave frequencies between 10 GHz and 100 GHz, between 30 GHz and 80 GHz, around 60 GHz, etc. If desired, transceiver circuitry 26 (FIG. 1) may change the frequency of optical local oscillator signal LO1 and/or optical local oscillator signal LO2 when switching from transmission to reception or vice versa. UTC PD 42 may preserve the data modulation of THF signals 34 in intermediate signals SIGIF. A receiver in transceiver circuitry 26 (FIG. 1) may demodulate intermediate frequency signals SIGIF (e.g., after further downconversion) to recover the wireless data from THF signals 34. In another example, wireless circuitry 24 may convert intermediate frequency signals SIGIF to the optical domain before recovering the wireless data. In yet another example, intermediate frequency signal path 44 may be omitted and UTC PD 42 may convert THF signals 34 into the optical domain for subsequent demodulation and data recovery (e.g., in a sideband of the optical signal).

Figure 4:
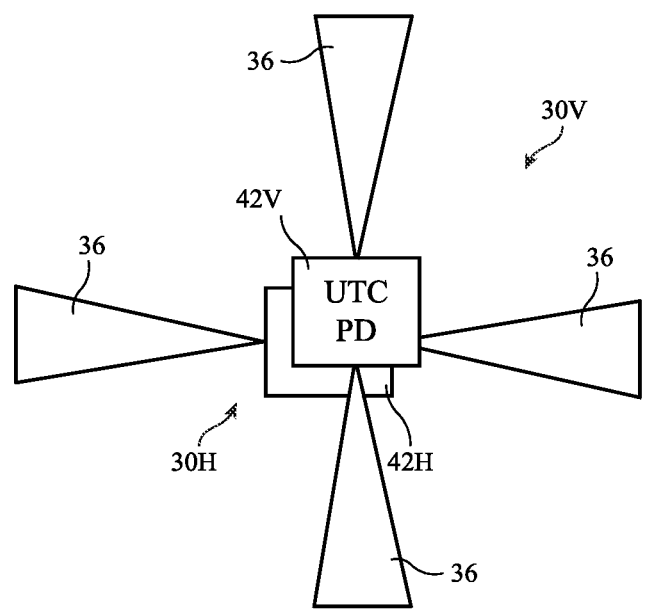
FIG. 4 is a top view showing how multiple antennas of the type shown in FIGS. 2 and 3 may be stacked to cover multiple polarizations in accordance with some embodiments.

The antenna 30 of FIGS. 2 and 3 may support transmission of THF signals 32 and reception of THF signals 34 with a given polarization (e.g., a linear polarization such as a vertical polarization). If desired, wireless circuitry 24 (FIG. 1) may include multiple antennas 30 for covering different polarizations. FIG. 4 is a diagram showing one example of how wireless circuitry 24 may include multiple antennas 30 for covering different polarizations.

As shown in FIG. 4, the wireless circuitry may include a first antenna 30 such as antenna 30V for covering a first polarization (e.g., a first linear polarization such as a vertical polarization) and may include a second antenna 30 such as antenna 30H for covering a second polarization different from or orthogonal to the first polarization (e.g., a second linear polarization such as a horizontal polarization). Antenna 30V may have a UTC PD 42 such as UTC PD 42V coupled between a corresponding pair of radiating element arms 36. Antenna 30H may have a UTC PD 42 such as UTC PD 42H coupled between a corresponding pair of radiating element arms 36 oriented non-parallel (e.g., orthogonal) to the radiating element arms 36 in antenna 30V. This may allow antennas 30V and 30H to transmit THF signals 32 with respective (orthogonal) polarizations and may allow antennas 30V and 30H to receive THF signals 32 with respective (orthogonal) polarizations.

To minimize space within device 10, antenna 30V may be vertically stacked over or under antenna 30H (e.g., where UTC PD 42V partially or completely overlaps UTC PD 42H). In this example, antennas 30V and 30H may both be formed on the same substrate such as a rigid or flexible printed circuit board. The substrate may include multiple stacked dielectric layers (e.g., layers of ceramic, epoxy, flexible printed circuit board material, rigid printed circuit board material, etc.). The radiating element arms 36 in antenna 30V may be formed on a separate layer of the substrate than the radiating element arms 36 in antenna 30H or the radiating element arms 36 in antenna 30V may be formed on the same layer of the substrate as the radiating element arms 36 in antenna 30H. UTC PD 42V may be formed on the same layer of the substrate as UTC PD 42H or UTC PD 42V may be formed on a separate layer of the substrate than UTC PD 42H. UTC PD 42V may be formed on the same layer of the substrate as the radiating element arms 36 in antenna 30V or may be formed on a separate layer of the substrate as the radiating element arms 36 in antenna 30V. UTC PD 42H may be formed on the same layer of the substrate as the radiating element arms 36 in antenna 30H or may be formed on a separate layer of the substrate as the radiating element arms 36 in antenna 30H.

Figure 5:
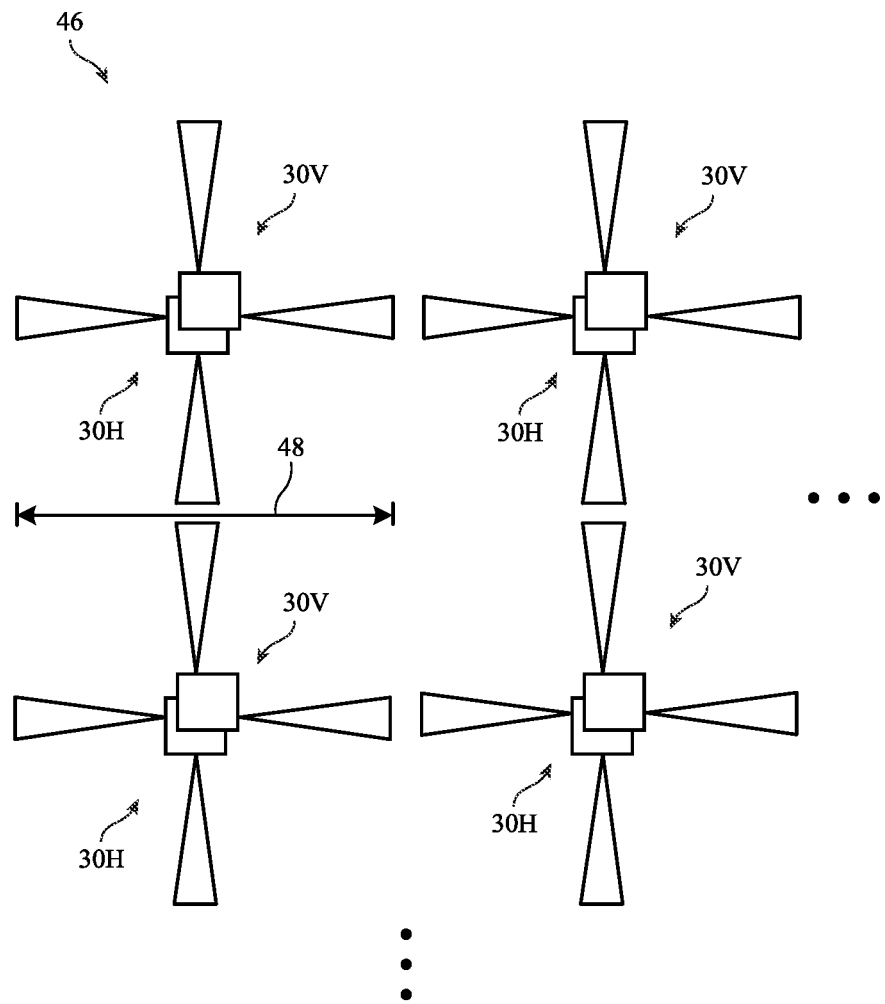
FIG. 5 is a top view showing how stacked antennas of the type shown in FIG. 4 may be integrated into a phased antenna array for conveying wireless signals at frequencies greater than about 100 GHz within a corresponding signal beam.

If desired, antennas 30 or antennas 30H and 30V of FIG. 4 may be integrated within a phased antenna array. FIG. 5 is a diagram showing one example of how antennas 30H and 30V may be integrated within a phased antenna array. As shown in FIG. 5, device 10 may include a phased antenna array 46 of stacked antennas 30H and 30V arranged in a rectangular grid of rows and columns. Each of the antennas in phased antenna array 46 may be formed on the same substrate. This is merely illustrative. In general, phased antenna array 46 (sometimes referred to as a phased array antenna) may include any desired number of antennas 30V and 30H (or non-stacked antennas 30) arranged in any desired pattern. Each of the antennas in phased antenna array 46 may be provided with a respective optical phase shift S (FIGS. 2 and 3) that configures the antennas to collectively transmit THF signals 32 and/or receive THF signals 34 that sum to form a signal beam of THF signals in a desired beam pointing direction. The beam pointing direction may be selected to point the signal beam towards external communications equipment, towards a desired external object, away from an external object, etc.

Phased antenna array 46 may occupy relatively little space within device 10. For example, each antenna 30V/30H may have a length 48 (e.g., as measured from the end of one radiating element arm to the opposing end of the opposite radiating element arm). Length 48 may be approximately equal to one-half the wavelength of THF signals 32 and 34. For example, length 48 may be as small as 0.5 mm or less. Each UTC-PD 42 in phased antenna array 46 may occupy a lateral area of 100 square microns or less. This may allow phased antenna array 46 to occupy very little area within device 10, thereby allowing the phased antenna array to be integrated within different portions of device 10 while still allowing other space for device components. The examples of FIGS. 2-5 are merely illustrative and, in general, each antenna may have any desired antenna radiating element architecture.

Figure 6:
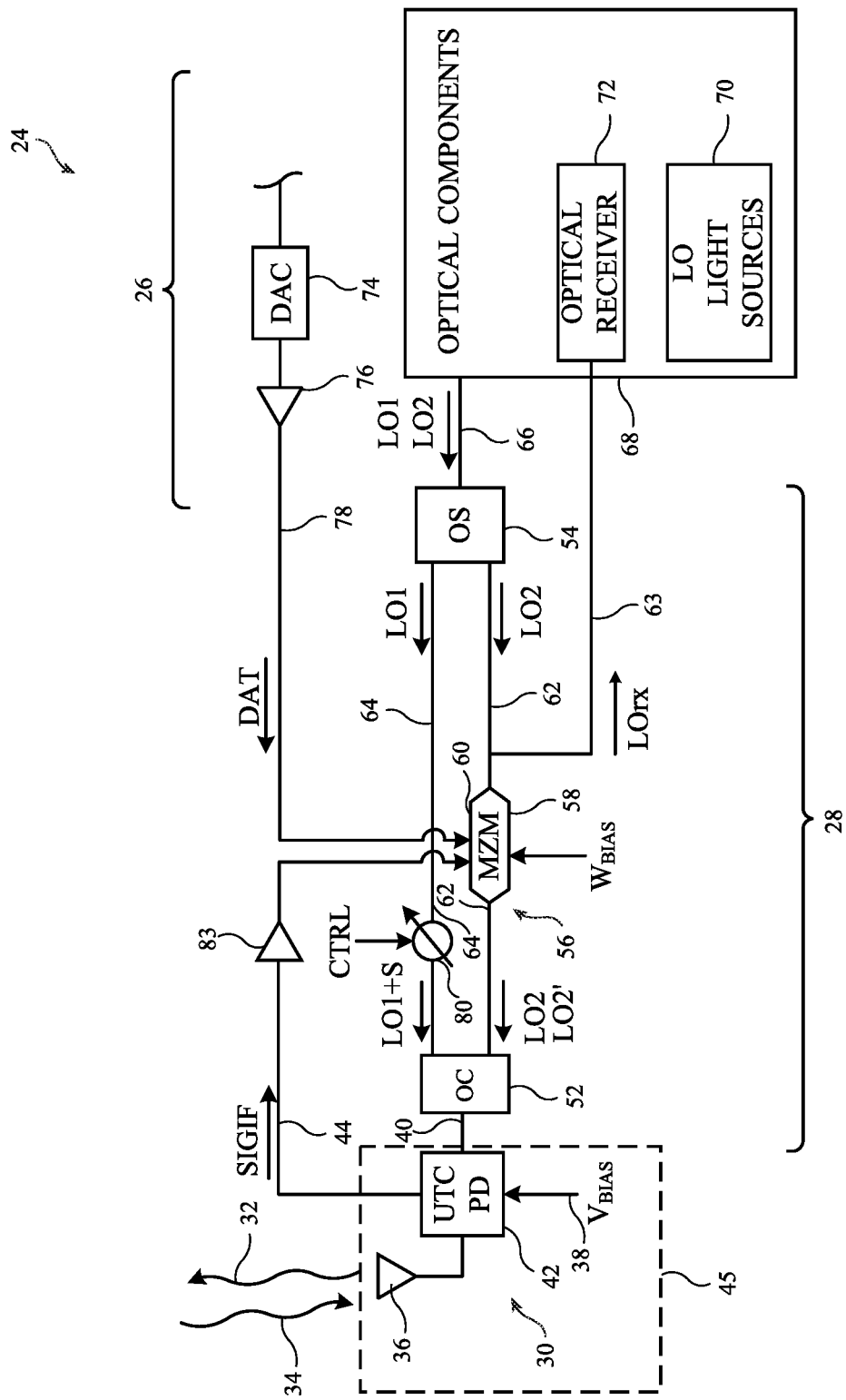
FIG. 6 is a circuit diagram of illustrative wireless circuitry having an antenna that transmits wireless signals at frequencies greater than about 100 GHz and that receives wireless signals at frequencies greater than about 100 GHz for conversion to intermediate frequencies and then to the optical domain in accordance with some embodiments.

FIG. 6 is a circuit diagram showing how a given antenna 30 and signal path 28 (FIG. 1) may be used to both transmit THF signals 32 and receive THF signals 34 based on optical local oscillator signals. In the example of FIG. 6, UTC PD 42 converts received THF signals 34 into intermediate frequency signals SIGIF that are then converted to the optical domain for recovering the wireless data from the received THF signals.

As shown in FIG. 6, wireless circuitry 24 may include transceiver circuitry 26 coupled to antenna 30 over signal path 28 (e.g., an optical signal path sometimes referred to herein as optical signal path 28). UTC PD 42 may be coupled between the radiating element arm(s) 36 of antenna 30 and signal path 28. Transceiver circuitry 26 may include optical components 68, amplifier circuitry such as power amplifier 76, and digital-to-analog converter (DAC) 74. Optical components 68 may include an optical receiver such as optical receiver 72 and optical local oscillator (LO) light sources (emitters) 70. LO light sources 70 may include two or more light sources such as laser light sources, laser diodes, optical phase locked loops, or other optical emitters that emit light (e.g., optical local oscillator signals LO1 and LO2) at respective wavelengths. If desired, LO light sources 70 may include a single light source and may include optical components for splitting the light emitted by the light source into different wavelengths. Signal path 28 may be coupled to optical components 68 over optical path 66. Optical path 66 may include one or more optical fibers and/or waveguides.

Signal path 28 may include an optical splitter such as optical splitter (OS) 54, optical paths such as optical path 64 and optical path 62, an optical combiner such as optical combiner (OC) 52, and optical path 40. Optical path 62 may be an optical fiber or waveguide. Optical path 64 may be an optical fiber or waveguide. Optical splitter 54 may have a first (e.g., input) port coupled to optical path 66, a second (e.g., output) port coupled to optical path 62, and a third (e.g., output) port coupled to optical path 64. Optical path 64 may couple optical splitter 54 to a first (e.g., input) port of optical combiner 52. Optical path 62 may couple optical splitter 54 to a second (e.g., input) port of optical combiner 52. Optical combiner 52 may have a third (e.g., output) port coupled to optical path 40.

An optical phase shifter such as optical phase shifter 80 may be (optically) interposed on or along optical path 64. An optical modulator such as optical modulator 56 may be (optically) interposed on or along optical path 62. Optical modulator 56 may be, for example, a Mach-Zehnder modulator (MZM) and may therefore sometimes be referred to herein as MZM 56. MZM 56 includes a first optical arm (branch) 60 and a second optical arm (branch) 58 interposed in parallel along optical path 62. Propagating optical local oscillator signal LO2 along arms 60 and 58 of MZM 56 may, in the presence of a voltage signal applied to one or both arms, allow different optical phase shifts to be imparted on each arm before recombining the signal at the output of the MZM (e.g., where optical phase modulations produced on the arms are converted to intensity modulations at the output of MZM 56). When the voltage applied to MZM 56 includes wireless data, MZM 56 may modulate the wireless data onto optical local oscillator signal LO2. If desired, the phase shifting performed at MZM 56 may be used to perform beam forming/steering in addition to or instead of optical phase shifter 80. MZM 56 may receive one or more bias voltages $W_{BIAS}$ (sometimes referred to herein as bias signals $W_{BIAS}$) applied to one or both of arms 58 and 60. Control circuitry 14 (FIG. 1) may provide bias voltage $W_{BIAS}$ with different magnitudes to place MZM 56 into different operating modes (e.g., operating modes that suppress optical carrier signals, operating modes that do not suppress optical carrier signals, etc.).

Intermediate frequency signal path 44 may couple UTC PD 42 to MZM 56 (e.g., arm 60). An amplifier such as low noise amplifier 83 may be interposed on intermediate frequency signal path 44. Intermediate frequency signal path 44 may be used to pass intermediate frequency signals SIGIF from UTC PD 42 to MZM 56. DAC 74 may have an input coupled to up-conversion circuitry, modulator circuitry, and/or baseband circuitry in a transmitter of transceiver circuitry 26. DAC 74 may receive digital data to transmit over antenna 30 and may convert the digital data to the analog domain (e.g., as data DAT). DAC 74 may have an output coupled to transmit data path 78. Transmit data path 78 may couple DAC 74 to MZM 56 (e.g., arm 60). Each of the components along signal path 28 may allow the same antenna 30 to both transmit THF signals 32 and receive THF signals 34 (e.g., using the same components along signal path 28), thereby minimizing space and resource consumption within device 10.

LO light sources 70 may produce (emit) optical local oscillator signals LO1 and LO2 (e.g., at different wavelengths that are separated by the wavelength of THF signals 32/34). Optical components 68 may include lenses, waveguides, optical couplers, optical fibers, and/or other optical components that direct the emitted optical local oscillator signals LO1 and LO2 towards optical splitter 54 via optical path 66. Optical splitter 54 may split the optical signals on optical path 66 (e.g., by wavelength) to output optical local oscillator signal LO1 onto optical path 64 while outputting optical local oscillator signal LO2 onto optical path 62.

Control circuitry 14 (FIG. 1) may provide phase control signals CTRL to optical phase shifter 80. Phase control signals CTRL may control optical phase shifter 80 to apply optical phase shift S to the optical local oscillator signal LO1 on optical path 64. Phase shift S may be selected to steer a signal beam of THF signals 32/34 in a desired pointing direction. Optical phase shifter 80 may pass the phase-shifted optical local oscillator signal LO1 (denoted as LO1+ S) to optical combiner 52. Signal beam steering is performed in the optical domain (e.g., using optical phase shifter 80) rather than in the THF domain because there are no satisfactory phase shifting circuit components that operate at frequencies as high as the frequencies of THF signals 32 and 34. Optical combiner 52 may receive optical local oscillator signal LO2 over optical path 62. Optical combiner 52 may combine optical local oscillator signals LO1 and LO2 onto optical path 40, which directs the optical local oscillator signals onto UTC PD 42 for use during signal transmission or reception.

During transmission of THF signals 32, DAC 74 may receive digital wireless data (e.g., data packets, frames, symbols, etc.) for transmission over THF signals 32. DAC 74 may convert the digital wireless data to the analog domain and may output (transmit) the data onto transmit data path 78 as data DAT (e.g., for transmission via antenna 30). Power amplifier 76 may amplify data DAT. Transmit data path 78 may pass data DAT to MZM 56 (e.g., arm 60). MZM 56 may modulate data DAT onto optical local oscillator signal LO2 to produce modulated optical local oscillator signal LO2' (e.g., an optical local oscillator signal at the frequency/wavelength of optical local oscillator signal LO2 but that is modulated to include the data identified by data DAT). Optical combiner 52 may combine optical local oscillator signal LO1 with modulated optical local oscillator signal LO2' at optical path 40.

Optical path 40 may illuminate UTC PD 42 with (using) optical local oscillator signal LO1 (e.g., with the phase shift S applied by optical phase shifter 80) and modulated optical local oscillator signal LO2'. Control circuitry 14 (FIG. 1) may apply a control signal $V_{BIAS}$ to UTC PD 42 that configures antenna 30 for the transmission of THF signals 32. UTC PD 42 may convert optical local oscillator signal LO1 and modulated optical local oscillator signal LO2' into antenna currents on radiating element arm(s) 36 at the frequency of THF signals 32 (e.g., while programmed for transmission using control signal $V_{BIAS}$). The antenna currents on radiating element arm(s) 36 may radiate THF signals 32. The frequency of THF signals 32 is given by the difference in frequency between optical local oscillator signal LO1 and modulated optical local oscillator signal LO2'. Control signals $V_{BIAS}$ may control UTC PD 42 to preserve the modulation from modulated optical local oscillator signal LO2' in the radiated THF signals 32. External equipment that receives THF signals 32 will thereby be able to extract data DAT from the THF signals 32 transmitted by antenna 30.

During reception of THF signals 34, MZM 56 does not modulate any data onto optical local oscillator signal LO2. Optical path 40 therefore illuminates UTC PD 42 with optical local oscillator signal LO1 (e.g., with phase shift S) and optical local oscillator signal LO2. Control circuitry 14 (FIG. 1) may apply a control signal VBIAS (e.g., a bias voltage) to UTC PD 42 that configures antenna 30 for the receipt of THF signals 32. UTC PD 42 may use optical local oscillator signals LO1 and LO2 to convert the received THF signals 34 into intermediate frequency signals SIGIF output onto intermediate frequency signal path 44 (e.g., while programmed for reception using bias voltage VBIAS¬). Intermediate frequency signals SIGIF may include the modulated data from the received THF signals 34. Low noise amplifier 83 may amplify intermediate frequency signals SIGIF, which are then provided to MZM 56 (e.g., arm 60). MZM 56 may convert intermediate frequency signals SIGIF to the optical domain as optical signals LOrx (e.g., by modulating the data in intermediate frequency signals SIGIF onto one of the optical local oscillator signals) and may pass the optical signals to optical receiver 72 in optical components 68, as shown by arrow 63 (e.g., via optical paths 62 and 66 or other optical paths). Control circuitry 14 (FIG. 1) may use optical receiver 72 to convert optical signals LOrx to other formats and to recover (demodulate) the data carried by THF signals 34 from the optical signals. In this way, the same antenna 30 and signal path 28 may be used for both the transmission and reception of THF signals while also performing beam steering operations.

The example of FIG. 6 in which intermediate frequency signals SIGIF are converted to the optical domain is merely illustrative. If desired, transceiver circuitry 26 may receive and demodulate intermediate frequency signals SIGIF without first passing the signals to the optical domain. For example, transceiver circuitry 26 may include an analog-to-digital converter (ADC), intermediate frequency signal path 44 may be coupled to an input of the ADC rather than to MZM 56, and the ADC may convert intermediate frequency signals SIGIF to the digital domain. As another example, intermediate frequency signal path 44 may be omitted and control signals $V_{BIAS}$ may control UTC PD 42 to directly sample THF signals 34 with optical local oscillator signals LO1 and LO2 to the optical domain. As an example, UTC PD 42 may use the received THF signals 34 and control signals $V_{BIAS}$ to produce an optical signal on optical path 40. The optical signal may have an optical carrier with sidebands that are separated from the optical carrier by a fixed frequency offset (e.g., 30-100 GHz, 60 GHz, 50-70 GHz, 10-100 GHz, etc.). The sidebands may be used to carry the modulated data from the received THF signals 34. Signal path 28 may direct (propagate) the optical signal produced by UTC PD 42 to optical receiver 72 in optical components 68 (e.g., via optical paths 40, 64, 62, 66, 63, and/or other optical paths). Control circuitry 14 (FIG. 1) may use optical receiver 72 to convert the optical signal to other formats and to recover (demodulate) the data carried by THF signals 34 from the optical signal (e.g., from the sidebands of the optical signal).

Figure 7:
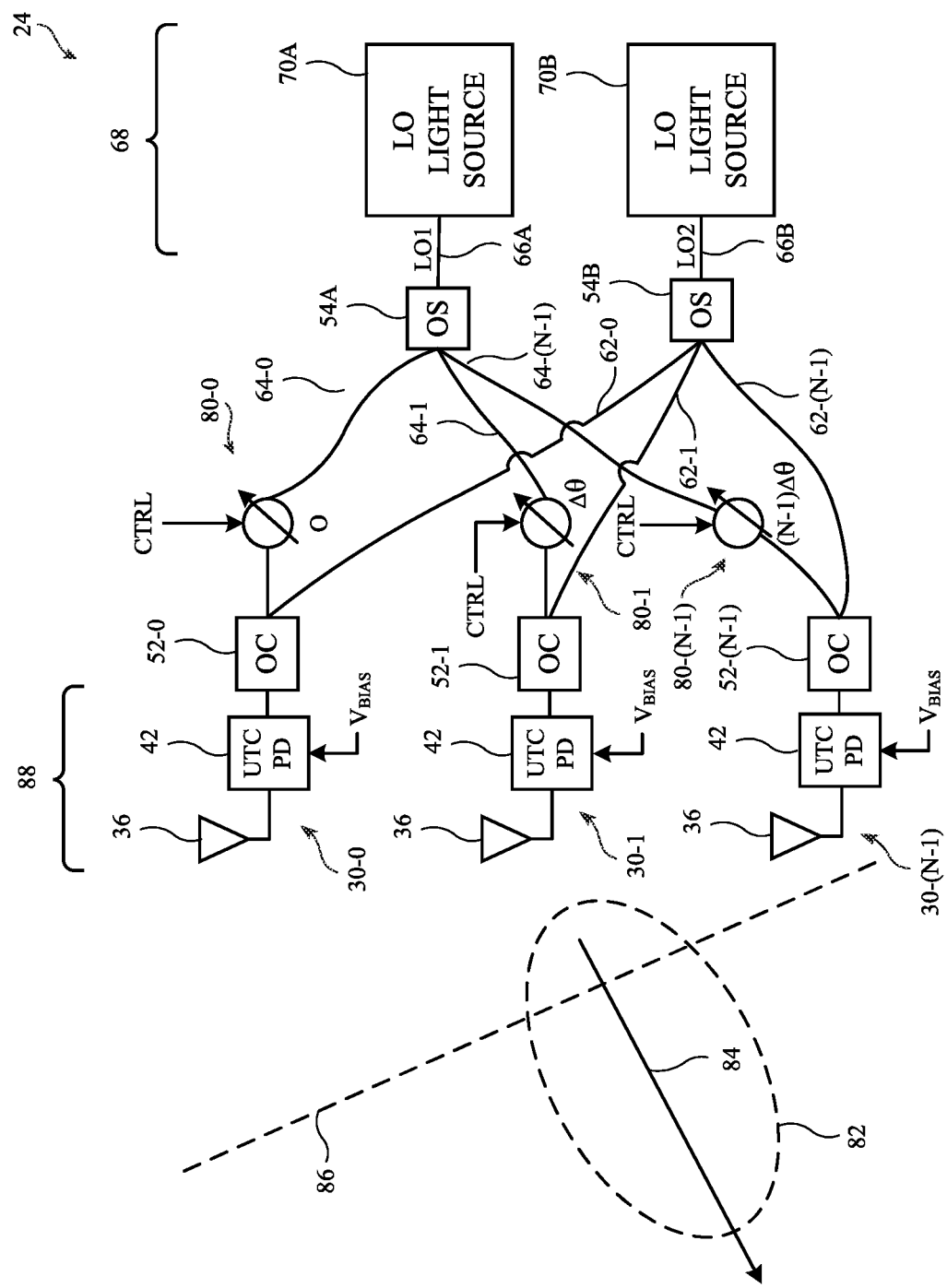
FIG. 7 is a circuit diagram of an illustrative phased antenna array that conveys wireless signals at frequencies greater than about 100 GHz within a corresponding signal beam in accordance with some embodiments.

FIG. 7 is a circuit diagram showing one example of how multiple antennas 30 may be integrated into a phased antenna array 88 that conveys THF signals over a corresponding signal beam. In the example of FIG. 7, MZMs 56, intermediate frequency signal paths 44, data paths 78, and optical receiver 72 of FIG. 6 have been omitted for the sake of clarity. Each of the antennas in phased antenna array 88 may alternatively sample received THF signals directly into the optical domain or may pass intermediate frequency signals SIGIF to ADCs in transceiver circuitry 26.

As shown in FIG. 7, phased antenna array 88 includes N antennas 30 such as a first antenna 30-0, a second antenna 30-1, and an Nth antenna 30-(N−1). Each of the antennas 30 in phased antenna array 88 may be coupled to optical components 68 via a respective optical signal path (e.g., optical signal path 28 of FIG. 6). Each of the N signal paths may include a respective optical combiner 52 coupled to the UTC PD 42 of the corresponding antenna 30 (e.g., the UTC PD 42 in antenna 30-0 may be coupled to optical combiner 52-0, the UTC PD 42 in antenna 30-1 may be coupled to optical combiner 52-1, the UTC PD 42 in antenna 30-(N−1) may be coupled to optical combiner 52-(N−1), etc.). Each of the N signal paths may also include a respective optical path 62 and a respective optical path 64 coupled to the corresponding optical combiner 52 (e.g., optical paths 64-0 and 62-0 may be coupled to optical combiner 52-0, optical paths 64-1 and 62-1 may be coupled to optical combiner 52-1, optical paths 64-(N−1) and 62-(N−1) may be coupled to optical combiner 52-(N−1), etc.).

Optical components 68 may include LO light sources 70 such as a first LO light source 70A and a second LO light source 70B. The optical signal paths for each of the antennas 30 in phased antenna array 88 may share one or more optical splitters 54 such as a first optical splitter 54A and a second optical splitter 54B. LO light source 70A may generate (e.g., produce, emit, transmit, etc.) first optical local oscillator signal LO1 and may provide first optical local oscillator signal LO1 to optical splitter 54A via optical path 66A. Optical splitter 54A may distribute first optical local oscillator signal LO1 to each of the UTC PDs 42 in phased antenna array 88 over optical paths 64 (e.g., optical paths 64-0, 64-1, 64-(N−1), etc.). Similarly, LO light source 70B may generate (e.g., produce, emit, transmit, etc.) second optical local oscillator signal LO2 and may provide second optical local oscillator signal LO2 to optical splitter 54B via optical path 66B. Optical splitter 54B may distribute second optical local oscillator signal LO2 to each of the UTC PDs 42 in phased antenna array 88 over optical paths 62 (e.g., optical paths 62-0, 62-1, 62-(N−1), etc.).

A respective optical phase shifter 80 may be interposed along (on) each optical path 64 (e.g., a first optical phase shifter 80-0 may be interposed along optical path 64-0, a second optical phase shifter 80-1 may be interposed along optical path 64-1, an Nth optical phase shifter 80-(N−1) may be interposed along optical path 64-(N−1), etc.). Each optical phase shifter 80 may receive a control signal CTRL that controls the phase S provided to optical local oscillator signal LO1 by that optical phase shifter (e.g., first optical phase shifter 80-0 may impart an optical phase shift of zero degrees/radians to the optical local oscillator signal LO1 provided to antenna 30-0, second optical phase shifter 80-1 may impart an optical phase shift of $\Delta\phi$ to the optical local oscillator signal LO1 provided to antenna 30-1, Nth optical phase shifter 80-(N−1) may impart an optical phase shift of $(N-1)\Delta\phi$ to the optical local oscillator signal LO1 provided to antenna 30-(N−1), etc.). By adjusting the phase S imparted by each of the N optical phase shifters 80, control circuitry 14 (FIG. 1) may control each of the antennas 30 in phased antenna array 88 to transmit THF signals 32 and/or to receive THF signals 34 within a formed signal beam 83. Signal beam 83 may be oriented in a particular beam pointing direction (angle) 84 (e.g., the direction of peak gain of signal beam 83). The THF signals conveyed by phased antenna array 88 may have wavefronts 86 that are orthogonal to beam pointing direction 84. Control circuitry 14 may adjust beam pointing direction 84 over time to point towards external communications equipment or an external object or to point away from external objects, as examples. The example of FIG. 7 only illustrates THF signal transmission using antennas 30 for the sake of clarity. If desired, the circuitry of FIG. 7 may be modified to additionally or alternatively receive THF signals (e.g., optical paths such as optical path 63 of FIG. 6 may be added to couple each optical path 62 of FIG. 7 to one or more optical receivers, intermediate frequency signals may be passed to a receiver, etc.).

Antenna radiating element arm(s) 36 and UTC PD 42 (FIG. 6) may sometimes be referred to herein collectively as access point (AP) 45 (e.g., a THF access point). In some implementations, a single access point 45 is used to communicate with a single external device (e.g., another device such as device 10, a wireless base station or access point, or other wireless (THF) communications equipment). If desired, transceiver 26 may use multiple access points distributed across one or more locations to concurrently communicate with one or more external devices over one or more streams of wireless signals (e.g., THF signals 32 and 34 of FIG. 1).

Figure 8:
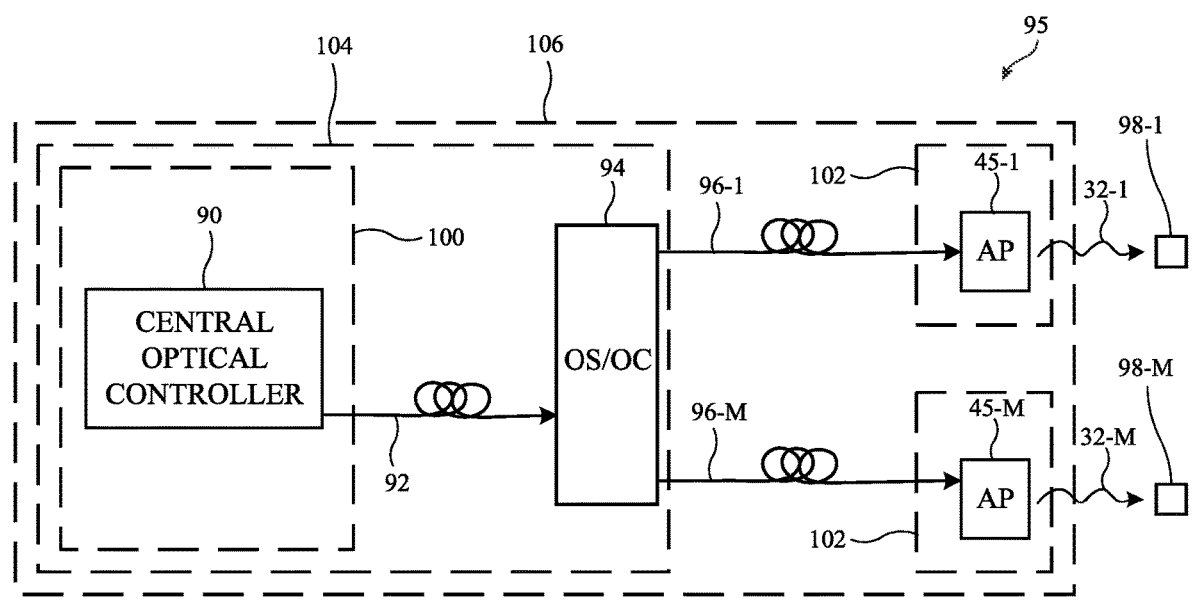
FIG. 8 is a diagram showing how an illustrative central optical controller may provide optical signals to multiple access points that convey wireless signals at frequencies greater than about 100 GHz based on the optical signals in accordance with some embodiments.

FIG. 8 is a diagram showing one example of how multiple access points 45 may use THF signals to communicate with multiple external devices. As shown in FIG. 8, wireless communications system 95 (sometimes referred to herein as THF system 95, wireless system 95, communications system 95, or simply as system 95) may include a set of M access points 45 (e.g., a first access point 45-1, an Mth access point 45-M, etc.). Each access point 45 may include one or more respective UTC PDs 42 (FIG. 6) and one or more antenna radiating element arms 36 (e.g., a set of antenna radiating element arms 36 arranged in a corresponding phased antenna array or antenna panel).

Wireless communications system 95 may also include a centralized optical controller such as central optical controller 90. Central optical controller 90 may sometimes also be referred to herein as central office 90, central chip 90, optical controller 90, or optical processor 90. Central optical controller 90 may include control circuitry such as control circuitry 14 of FIG. 1. The components of wireless circuitry 24 of FIG. 6 may be distributed between access points 45 and central optical controller 90 of FIG. 8. For example, central optical controller 90 may include transceiver 26 and signal path 28 of FIG. 6.

Central optical controller 90 may be communicably coupled to each of the M access points 45 over optical signal paths. As shown in FIG. 8, central optical controller 90 may be coupled to optical splitter/combiner 94 over optical path 92. Optical splitter/combiner 94 may also sometimes be referred to herein as an optical demultiplexer/multiplexer. Optical path 92 may include one or more optical fibers and/or waveguides. Optical splitter/combiner 94 may couple optical path 62 to each of the M access points 45 over a respective optical path 96 (e.g., optical splitter/combiner 94 may be coupled to access point 45-1 over optical path 96-1, may be coupled to access point 45-M over optical path 96-M, etc.). Each optical path 96 include one or more optical fibers and/or waveguides. In this way, optical signal path 92, optical splitter/combiner 94, and optical signal paths 96 may form optical path 40 of FIG. 6 for each of the M access points 45 in wireless communications system 95, for example.

Central optical controller 90 may be co-located with access points 45 or may be disposed at a location separated from access points 45. For example, central optical controller 90, optical path 92, optical splitter/combiner 94, and access points 45 may all be enclosed within an electronic device housing such as housing 106 (e.g., a housing such as housing 12 of FIG. 1). When configured in this way, central optical controller 90, optical path 92, optical splitter/combiner 94, and access points 45 may all form components of a corresponding device 10 (e.g., a single laptop computer, cellular telephone, tablet computer, wristwatch device, portable media player, home entertainment console, desktop computer, gaming controller, head-mounted device, etc.). In these examples, access points 45 may be distributed across multiple locations on device 10 (e.g., in respective corners of the device housing, at different sides of the device housing, etc.).

As another example, central optical controller 90 may be enclosed within a first housing such as housing 100 (e.g., a housing such as housing 12 of FIG. 1) whereas each access point 45 is enclosed within a respective housing 102 (e.g., a housing such as housing 12 of FIG. 1). If desired, central optical controller 90, optical path 92, and optical splitter/combiner 94 may be enclosed within a first housing such as housing 104 (e.g., a housing such as housing 12 of FIG. 1) that is separate from the housing(s) that include access points 45. When configured in this way, central optical controller 90 may be located within a first device 10 whereas each of the access points 45 is located in a different respective device 10, for example. If desired, two or more (e.g., all) of the access points 45 may be mounted within the same (shared) housing. In these configurations, the two or more access points 45 (e.g., all of the access points 45) may be located within a single device 10 that is separate from the device 10 that includes central optical controller 90.

In other words, wireless communications system 95 may be located within a single device 10 or may be distributed across multiple devices 10. In examples where the components of wireless communications system 95 are located within a single device 10, access points 45 may be distributed across one or more locations in the device that are separate from central optical controller 90 and optical fiber 92 may be on the order of inches, centimeters, or meters in length. In examples where the components of wireless communications system 95 are located within different devices 10, central optical controller 90 may be located in the same room or a different room of the same building or a different building as access points 45 or may be located in a different geographic region from access points 45 (e.g., optical fiber 92 may be as long as a few km, dozens of km, hundreds of km, or thousands of km in length). If desired, optical fiber 92 may include multiple optical fibers that are coupled together in series using optical couplers, optical boosters/amplifiers, optical relays, etc.

Central optical controller 90 may generate optical local oscillator signals for access points 45. Central optical controller 90 may transmit the optical local oscillator signals over optical fiber 92. Optical splitter/combiner 94 may distribute different optical local oscillator signals (e.g., at different frequencies) to access points 45 over optical paths 96. Access points 45 may transmit wireless signals 32 using the optical local oscillator signals. Each access point 45 may transmit respective THF signals 32 to different respective external devices 98 (e.g., access point 45-1 may transmit THF signals 32-1 to external device 98-1, access point 45-M may transmit THF signals 32-M to external device 98-M, etc.). The frequencies of THF signals 32 may be given by the difference in wavelength between the optical local oscillator signals provided to each access point 45. External devices 98 may be other devices such as device 10, wireless base station or access points, or other wireless (THF) communications equipment, for example. While FIG. 8 illustrates the transmission of THF signals 32, wireless communications system 95 may additionally or alternatively receive THF signals 34 (FIG. 1) from external devices 98.

When arranged in this way, wireless communications system 95 performs wavelength-division multiplexing (WDM) to concurrently convey wireless signals using access points 45. The WDM may be performed both in the optical domain between central optical controller 90 and access points 45 and in the radio-frequency and THF domain within access points 45. In some implementations, central optical controller 90 includes individual light sources (lasers) that are used to generate optical local oscillator signals at different respective wavelengths for each of the access points 45 in communications system 95. However, this may undesirably increase the cost of wireless communications system 95, the size of central optical controller 90, the power consumption by central optical controller 90, and the synchronization between channels. To mitigate these issues, central optical controller 90 may generate an optical frequency comb signal that is distributed to access points 45 for use in conveying wireless signals 32 and/or 34.

Figure 9:
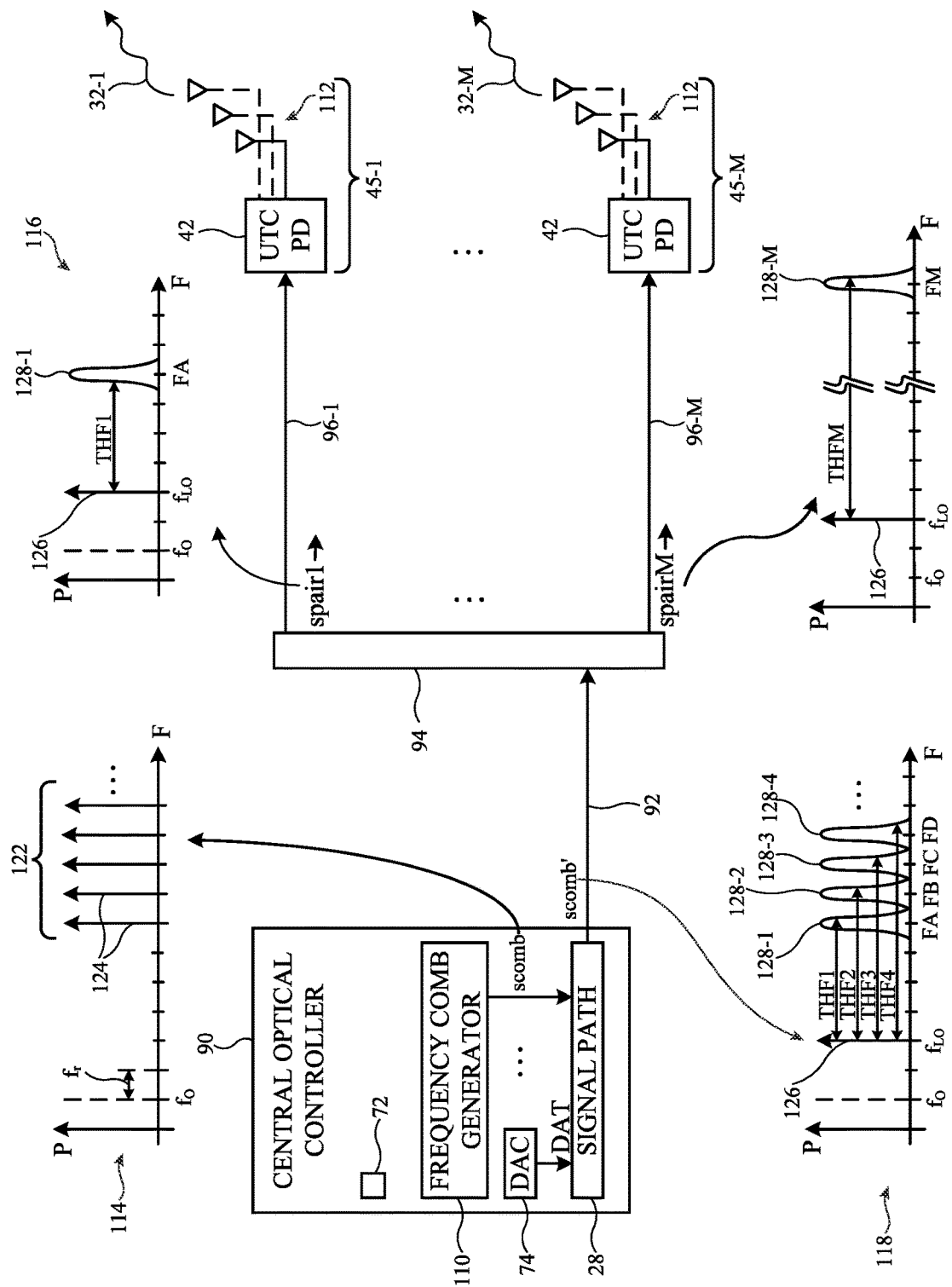
FIG. 9 is a diagram showing how an illustrative central optical controller may generate an optical frequency comb signal that is distributed among multiple access points that convey wireless signals at frequencies greater than about 100 GHz based on an optical local oscillator and a respective optical carrier in the optical frequency comb signal in accordance with some embodiments.

FIG. 9 is a diagram showing how central optical controller 90 may generate an optical frequency comb signal that is distributed to access points 45 for use in conveying wireless signals 32 and/or 34 (e.g., under a wavelength multiplexing (WDM) scheme where a single LO and multiple bands on fiber are converted to multiple THF bands for serving a single access point or for distribution and splitting across several access points). As shown in FIG. 9, central optical controller 90 may include optical receiver 72, DAC 74, and signal path 28. Central optical controller 90 may also include an optical frequency comb signal generator such as frequency comb generator 110 (sometimes referred to herein as optical signal generator 110). Frequency comb generator 110 may include LO light sources 70 (FIG. 6) and/or other light emitters that generate an optical frequency comb signal such as frequency comb signal scomb. Frequency comb signal scomb may include an optical LO signal and a comb of optical signals that are offset from the optical LO signal.

A comb of optical signals (sometimes referred to as an optical frequency comb or a frequency comb) is a set of evenly-spaced spectral lines (carriers) in the frequency domain at optical frequencies (e.g., where each carrier forms a respective "tooth" of the comb). The optical frequency comb may, for example, include n evenly-spaced carriers, each of which has a respective carrier frequency $f_n$ given by the formula $f_n = n*f_r + f_0$, where $f_r$ is the frequency of the THF signals to be produced by a given access point 45 using that carrier at carrier frequency $f_n$ and $f_0$ is an offset frequency from 0 Hz (DC). Frequency $f_r$ also corresponds to the difference in frequency between adjacent carriers (e.g., the line spacing of the comb). Frequency $f_r$ may sometimes be referred to herein as comb tooth spacing $f_r$, repetition rate $f_r$, an offset frequency, or a frequency gap.

The phases of each of the n carriers in the optical frequency comb may be the same (e.g., all the carriers are phase-locked with respect to each other). In the time domain, the optical frequency comb corresponds to a train of optical pulses and frequency $f_r$ relates to the inverse of the period of the pulse train (e.g., repetition rate). Offset frequency $f_0$ indicates that the oscillation frequencies of the spectral lines in the optical frequency comb are not necessarily an integer multiple of the repetition rate. Since offset frequency $f_0$ is most generally independent of frequency $f_r$, there are two degrees of freedom in an optical pulse train that define the absolute position of the lines in the frequency domain.

The origin of the offset frequency $f_0$ may depend on the comb generation architecture implemented in frequency comb generator 110. Frequency comb generator 110 may include, for example, mode-locked lasers. In these implementations, the origin of the offset frequency $f_0$ may depend on the relation between the group and phase velocity in the resonating cavity. In implementations where frequency comb generator 110 generates frequency comb signals as modulation spectra around a central frequency $f_c$, the origin of the offset frequency $f_0$ may depend on the absolute value of the central frequency. For these types of frequency comb signals, frequency $f_c$ may itself form offset frequency $f_0$ to define the absolute position of the comb. These types of frequency combs may exhibit phase locking between spectral lines. If desired, frequency comb generator 110 may include one or more lasers that emit an optical LO signal and/or one or more other optical signals and one or more resonant cavities that produce the optical frequency comb using the optical LO signal and/or the one or more other optical signals.

Plot 114 of FIG. 9 shows one example of the optical frequency comb in frequency comb signal scomb, in units of power P as a function of frequency F. As shown in plot 114, frequency comb signal scomb may include a set 122 of n uniformly-spaced carriers (spectral lines) 124. Set 122 may sometimes also be referred to herein as optical frequency comb 122. Each carrier 124 may be at a respective carrier frequency and may be separated from one or two adjacent carriers 124 by frequency $f_r$. The first carrier in set 122 is separated from offset frequency $f_0$ by a fixed amount. Shifting offset frequency $f_0$ may serve to shift the absolute frequency of each carrier 124. Carriers 124 may sometimes also be referred to herein as optical carriers 124, frequency comb carriers 124, frequency comb components 124, spectral peaks 124, lines 124, or optical tones 124 (e.g., set 122 may form a comb-shaped pattern of optical tones 124 each at a respective carrier frequency and separated from one or two other optical tones 124 in set 122 by the same frequency $f_r$). Frequency comb generator 110 may also add an optical LO signal at a corresponding local oscillator frequency $f_{LO}$ to the optical frequency comb in frequency comb signal scomb (e.g., frequency comb signal scomb may include the optical LO signal at LO frequency $f_{LO}$ and the optical frequency comb shown by set 122 of plot 114).

As shown in FIG. 9, frequency comb generator 110 may generate frequency comb signal scomb and may provide frequency comb signal scomb to signal path 28. During signal transmission, DAC 74 may provide wireless data DAT to signal path 28. One or more optical modulators on signal path 28 (e.g., MZM 56 of FIG. 6) may modulate wireless data DAT onto the n carriers 124 in frequency comb signal scomb to produce modulated frequency comb signal scomb'. Signal path 28 may output modulated frequency comb signal scomb' to optical splitter/combiner 94 over optical path 92.

Plot 118 of FIG. 9 shows modulated frequency comb signal scomb' in units of power P as a function of frequency F. As shown in plot 118, modulated frequency comb signal scomb' may include optical LO signal 126 at LO frequency $f_{LO}$. LO frequency $f_{LO}$ may be offset with respect to offset frequency $f_0$. LO signal 126 may be added to frequency comb signal scomb by a separate laser or, if desired, one of the carriers 124 of set 122 may form the optical LO at LO frequency $f_{LO}$ (e.g., assuming $n*f_r + f_0$, where n is an integer, meets LO frequency $f_{LO}$).

The optical modulator(s) in signal path 28 may module wireless data DAT onto M carriers 124 in set 122 of frequency comb signal scomb to produce corresponding modulated carriers 128 in modulated frequency comb signal scomb'. For example, signal path 28 may modulate wireless data onto a first carrier 124 at carrier frequency FA to produce modulated carrier 128-1 at carrier frequency FA in modulated frequency comb signal scomb', may modulate wireless data onto a second carrier 124 at carrier frequency FB to produce modulated carrier 128-2 at carrier frequency FB in modulated frequency comb signal scomb', may modulate wireless data onto a third carrier 124 at carrier frequency FC to produce modulated carrier 128-3 at carrier frequency FC in modulated frequency comb signal scomb', and may modulate wireless data onto a fourth carrier 124 at carrier frequency FD to produce modulated carrier 128-4 at carrier frequency FD in modulated frequency comb signal scomb' (in an example where there are at least M=4 access points 45).

Each modulated carrier 128 may be separated in frequency from optical LO frequency $f_{LO}$ by a corresponding THF frequency THFi (e.g., modulated carrier 128-1 and carrier frequency FA may be separated from optical LO signal 126 and LO frequency $f_{LO}$ by THF frequency THF1, modulated carrier 128-2 and carrier frequency FB may be separated from optical LO signal 126 and LO frequency $f_{LO}$ by THF frequency THF2, modulated carrier 128-3 and carrier frequency FC may be separated from optical LO signal 126 and LO frequency $f_{LO}$ by THF frequency THF3, and modulated carrier 128-4 and carrier frequency FD may be separated from optical LO signal 126 and LO frequency $f_{LO}$ by THF frequency THF4).

Optical splitter/combiner 94 may receive modulated frequency comb signal scomb' from signal path 28 over optical path 92. Optical splitter/combiner 94 may split (demultiplex) modulated frequency comb signal scomb' into M signal (tone) pairs spair that are provided to respective access points 45 over optical paths 96. Each signal pair spair may include optical LO signal 126 (e.g., a first optical tone) and a respective one of the modulated carriers 128 from modulated frequency comb signal scomb' (e.g., a second optical tone). For example, optical splitter/combiner 94 may demultiplex modulated frequency comb signal scomb' by wavelength/frequency into a first signal pair spair1 (e.g., having optical LO signal 126 and modulated carrier 128-1 at frequency FA, as shown by plot 116) that is provided to access point 45-1 over optical path 96-1, an Mth signal pair spairM (e.g., having optical LO signal 126 and modulated carrier 128-M at frequency FM, as shown by plot 120) that is provided to access point 45-M over optical path 96-M, etc. If desired, each access point 45 may include one or more filters that filter out wavelengths other than the wavelengths of the signal pair spair provided to the access point.

The UTC PD(s) 42 in each access point 45 may transmit corresponding THF signals 32 over a respective set of antennas 112 based on the optical LO signal 126 and the corresponding modulated carrier 128 received from optical splitter/combiner 94 (e.g., where optical LO signal 126 forms optical LO signal LO1 and the modulated carrier 128 forms optical LO signal LO2 of FIG. 6). The difference in frequency between optical LO signal 126 and the corresponding modulated carrier 128 may determine the frequency of the THF signals 32 transmitted by each access point 45. For example, access point 45-1 may transmit THF signals 32-1 at frequency THF1 and access point 45-M may transmit THF signals 32-M at frequency THFM. The set of antennas 112 in each access point 45 may include one or more antenna radiating element arms 36 (FIG. 6) that share a single UTC PD 42 or that are coupled to respective UTC PDs 42 in the access point 45 (e.g., each access point 45 may, if desired, include multiple UTC PDs 42 illuminated by the same signal pair spair). The set of antennas 112 in each access point 45 may, if desired, form a respective phased antenna array or different antennas from different access points may form part of the same phased antenna array.

In this way, central optical controller 90 may provide phase-locked optical signals to multiple access points 45 to control the access points to communicate using THF signals with multiple external devices 98 (FIG. 8) at respective THF frequencies (e.g., using a carrier aggregation scheme) while minimizing cost, size, and power consumption, and while ensuring that each of the access points are accurately synchronized with each other. The example of FIG. 9 in which access points 45 are used to transmit THF signals is merely illustrative. Additionally or alternatively, access points 45 may receive THF signals (e.g., central optical controller 90 need not modulate data onto frequency comb signal scomb). If desired, there may be M=1 access point that includes different sets of antennas 112 that serve several different frequency channels using multiple signal pairs spair. In general, one bandwidth may be distributed to one access point, multiple bandwidths may be distributed to one access point (e.g., all WDMs may be provided to a single access point), multiple bandwidths may be distributed to all access points, etc. If desired, dual-polarization may be performed in addition to WDM and may be applied to both the optical fiber and radio resources of the communications system.

Figure 10:
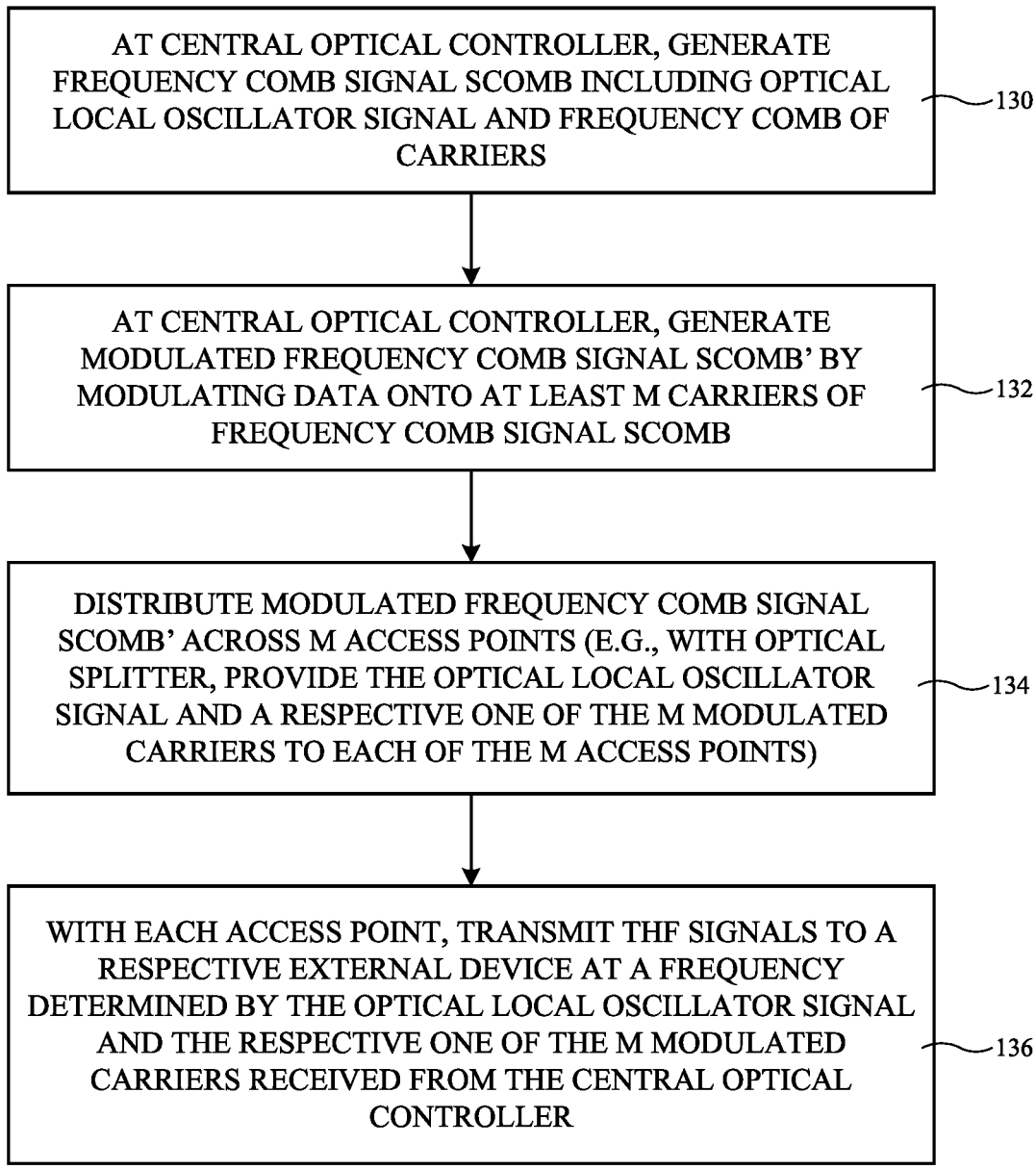
FIG. 10 is a flow chart of illustrative operations involved in using multiple access points to transmit wireless signals at frequencies greater than about 100 GHz using an optical frequency comb signal in accordance with some embodiments.

FIG. 10 is a flow chart of illustrative operations involved in using multiple access points 45 to transmit wireless signals at frequencies greater than about 100 GHz using an optical frequency comb signal generated by central optical controller 90. At operation 130, frequency comb generator 110 on central optical controller 90 may generate frequency comb signal scomb. Frequency comb signal scomb may include an optical frequency comb that includes set 122 of M optical carriers 124 (e.g., as shown by plot 114 of FIG. 9) and optical LO signal 126.

At operation 132, signal path 28 may generate modulated frequency comb signal scomb' by modulating data DAT onto each of the carriers 124 in frequency comb signal scomb to produce modulated carriers 128 (e.g., as shown by plot 118 of FIG. 9).

At operation 134, optical path 92, optical splitter/combiner 94, and optical paths 96 may distribute modulated optical comb signal scomb' across the M access points 45. For example, respective signal pairs spair may be provided to each of the M access points 45, where each signal pair spair includes optical LO signal 126 and a respective modulated carrier 128.

At operation 136, each of the M access points 45 may illuminate one or more UTC PDs 42 using its received signal pair spair to transmit wireless signals 32 to a respective external device 98 over one or more antennas 112. The frequency of wireless signals 32 may be given by the frequency between optical LO signal 126 and the modulated carrier 128 in the signal pair spair used to illuminate the UTC PDs 42. If desired, the operations of FIG. 10 may be modified to receive wireless data using access points 45.

If desired, central optical controller 90 may use a single access point 45 to perform multi-user (MU) and/or single-user (SU) multiple input and multiple output (MIMO) communications. In MU MIMO, the access point concurrently conveys multiple data streams with multiple external devices 98 using wireless signals at the same THF frequency. In SU MIMO, the access point concurrently conveys multiple data streams with a single external device 98 using wireless signals at the same THF frequency (e.g., by exploiting the greater than one rank of a transmission system). This often requires rich scattering in the environment, which may be difficult to achieve at THF frequencies.

For both MU MIMO and SU MIMO, for a given bandwidth, more data streams need to be provided in optical fiber concurrently. Spatial multiplexing is an option in fiber resources for more than one fiber core but may have substantial cost and deployment drawbacks. If desired, central optical controller 90 may perform SU MIMO and MU MIMO over a single optical fiber such as optical fiber 140 of FIG. 11.

Figure 11:
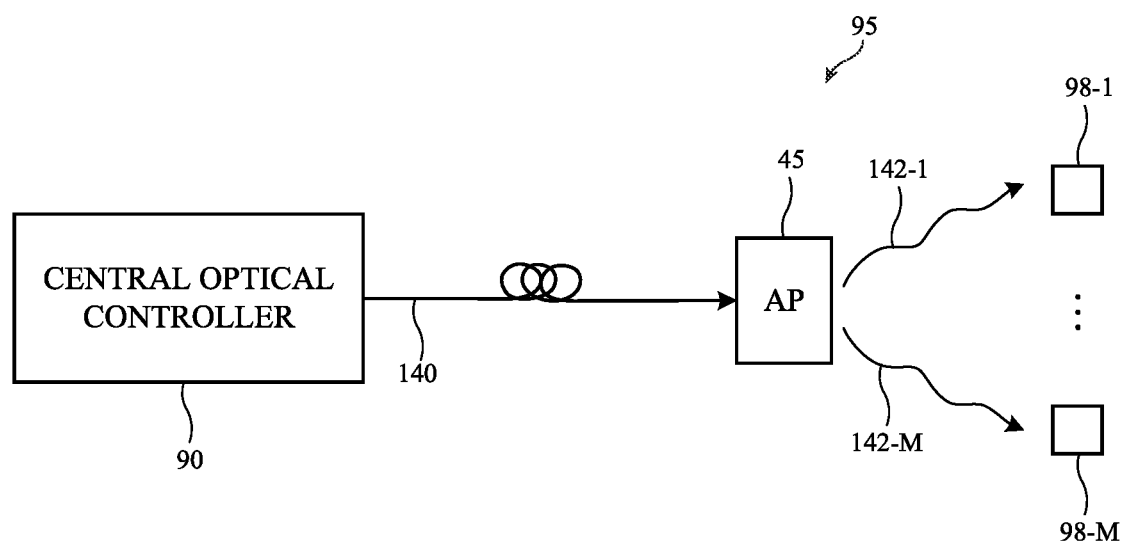
FIG. 11 is a diagram showing how an illustrative central optical controller may provide optical signals to a single access point that conveys multiple streams of wireless signals at frequencies greater than about 100 GHz based on the optical signals in accordance with some embodiments.

As shown in FIG. 11, communications system 95 may include a single access point 45 coupled to central optical controller 90 over optical fiber 140. Access point 45 may concurrently transmit M parallel streams of wireless data within THF signals 142 (e.g., THF signals 142-1, THF signals 142-M, etc.). In an SU MIMO implementation, access point 45 may transmit each stream to a single external device 98. In an MU MIMO implementation, access point 45 may transmit each stream to a respective one of M different external devices 98 (e.g., external device 98-1, external device 98-M, etc.). Access point 45 may include one or more UTC PDs 42 coupled to one or more antennas 112.

Figure 12:
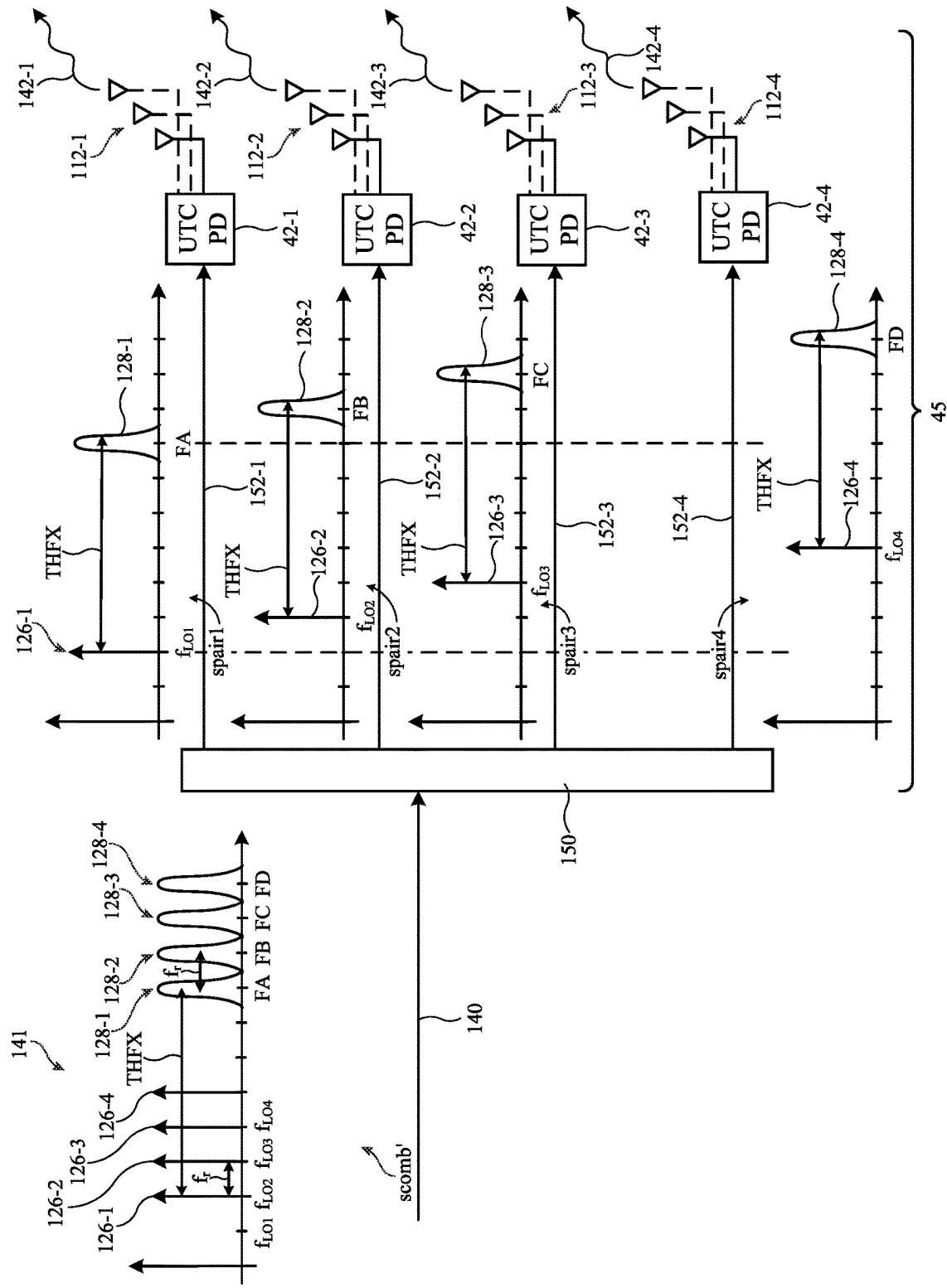
FIG. 12 is a diagram showing how respective local oscillators and corresponding optical carriers from an optical frequency comb signal may be distributed across multiple photodiodes in an access point for conveying multiple streams of wireless signals at frequencies greater than about 100 GHz in accordance with some embodiments.

FIG. 12 is a diagram showing how central optical controller 90 may control access point 45 to transmit concurrent wireless streams under a MU MIMO or SU MIMO arrangement (e.g., for targeting several streams to the same THF frequency). In the example of FIG. 12, access point 42 includes M=4 parallel wireless streams for MIMO and four UTC PDs 42 (e.g., UTC PDs 42-1, 42-2, 42-3 and 42-4) for producing respective streams of THF signals 142 (e.g., THF signals 142-1, 142-2, 142-3, and 142-4, respectively) using corresponding sets of antennas 112 (e.g., antennas 112-1 coupled to UTC PD 42-1, antennas 112-2 coupled to UTC PD 42-2, antennas 112-3 coupled to UTC PD 42-3, and antennas 112-4 coupled to UTC PD 42-4). Depending on the array response, the streams may serve the same spatial direction (e.g., for SU-MIMO with M streams), different spatial directions (e.g., for MU-MIMO with one stream oriented in each direction for spatial distribution to user(s)), or any combination in between.

As shown in FIG. 12, central optical controller 90 may provide modulated frequency comb signal scomb' over optical path 140. When operating under a MU MIMO or SU MIMO scheme, central optical controller 90 may generate modulated frequency comb signal scomb' with a set of optical LO signals 126 that are each separated from a respective modulated carrier 128 by the same frequency THFX. Each optical LO signal 126 may therefore be separated from one or two adjacent optical LO signals 126 by frequency $f_r$. For example, as shown by plot 141 of FIG. 12, modulated frequency comb signal scomb' may include a first optical LO signal 126-1 at a first LO frequency $f_{LO1}$ separated from modulated carrier 128-1 at frequency FA by frequency THFX, may include a second optical LO signal 126-2 at a second LO frequency $f_{LO2}$ separated from modulated carrier 128-2 at frequency FB by frequency THFX, may include a third optical LO signal 126-3 at a third LO frequency $f_{LO3}$ separated from modulated carrier 128-3 at frequency FC by frequency THFX, and may include a fourth optical LO signal 126-4 at a fourth LO frequency $f_{LO4}$ separated from modulated carrier 128-4 at frequency FD by frequency THFX. Frequency comb generator 110 (FIG. 9) may, for example, add each of the optical LO signals at frequencies $f_{LOx}$ to the spectrum of modulated frequency comb signal scomb' using a separate laser or using carriers of the optical frequency comb (e.g., carriers 124 in set 122 of FIG. 9).

Demultiplexer 150 (e.g., an optical splitter/combiner) may provide a respective signal pair spair from modulated frequency comb signal scomb' to each of the M UTC PDs 42 in access point 45 over a respective optical path 152. For example, demultiplexer 150 may provide a first signal pair spair1 that includes optical LO signal 126-1 at frequency $f_{LO1}$ and that includes modulated carrier 128-1 at carrier frequency FA to UTC PD 42-1 over optical path 152-1 for transmission as THF signals 142-1 by antennas 112-1, may provide a second signal pair spair2 that includes optical LO signal 126-2 at frequency $f_{LO2}$ and that includes modulated carrier 128-2 at carrier frequency FB to UTC PD 42-2 over optical path 152-2 for transmission as THF signals 142-2 by antennas 112-2, may provide a third signal pair spair3 that includes optical LO signal 126-3 at frequency $f_{LO3}$ and that includes modulated carrier 128-3 at carrier frequency FC to UTC PD 42-3 over optical path 152-3 for transmission as THF signals 142-3 by antennas 112-3, and may provide a fourth signal pair spair4 that includes optical LO signal 126-4 at frequency $f_{LO4}$ and that includes modulated carrier 128-4 at carrier frequency FD to UTC PD 42-4 over optical path 152-4 for transmission as THF signals 142-4 by antennas 112-4.

Access point 45 may include optical filters (e.g., on optical paths 152) that filter out the optical local oscillators and modulated carriers other than the signal pair spair intended for each UTC PD 42. Since each signal pair spair includes a carrier 126 separated from a corresponding modulated carrier 128 by the same frequency THFX, THF signals 142-1, 142-2, 142-3, and 142-4 may each be transmitted at the same frequency THFX, for example. If there are multiple external devices 98 that are spatially separated, antennas 112-1, 112-2, 112-3, and 112-4 may transmit THF signals 142-1, 142-2, 142-3, and 142-4 in different respective directions (e.g., using beam forming). Dual polarization may also be added to the MIMO streams both in the optical fiber and in radio resources. The example of FIG. 12 in which access point 45 is used to transmit THF signals is merely illustrative. Additionally or alternatively, access point 45 may receive THF signals (e.g., central optical controller 90 need not modulate data onto frequency comb signal scomb). The example of FIG. 12 in which a single access point is used is merely illustrative. In general, there may be (e.g., for the same THF frequency) two streams provided to a first access point and two streams provided to a second access point or any combination of number of streams provided to any number of access points.

Figure 13:
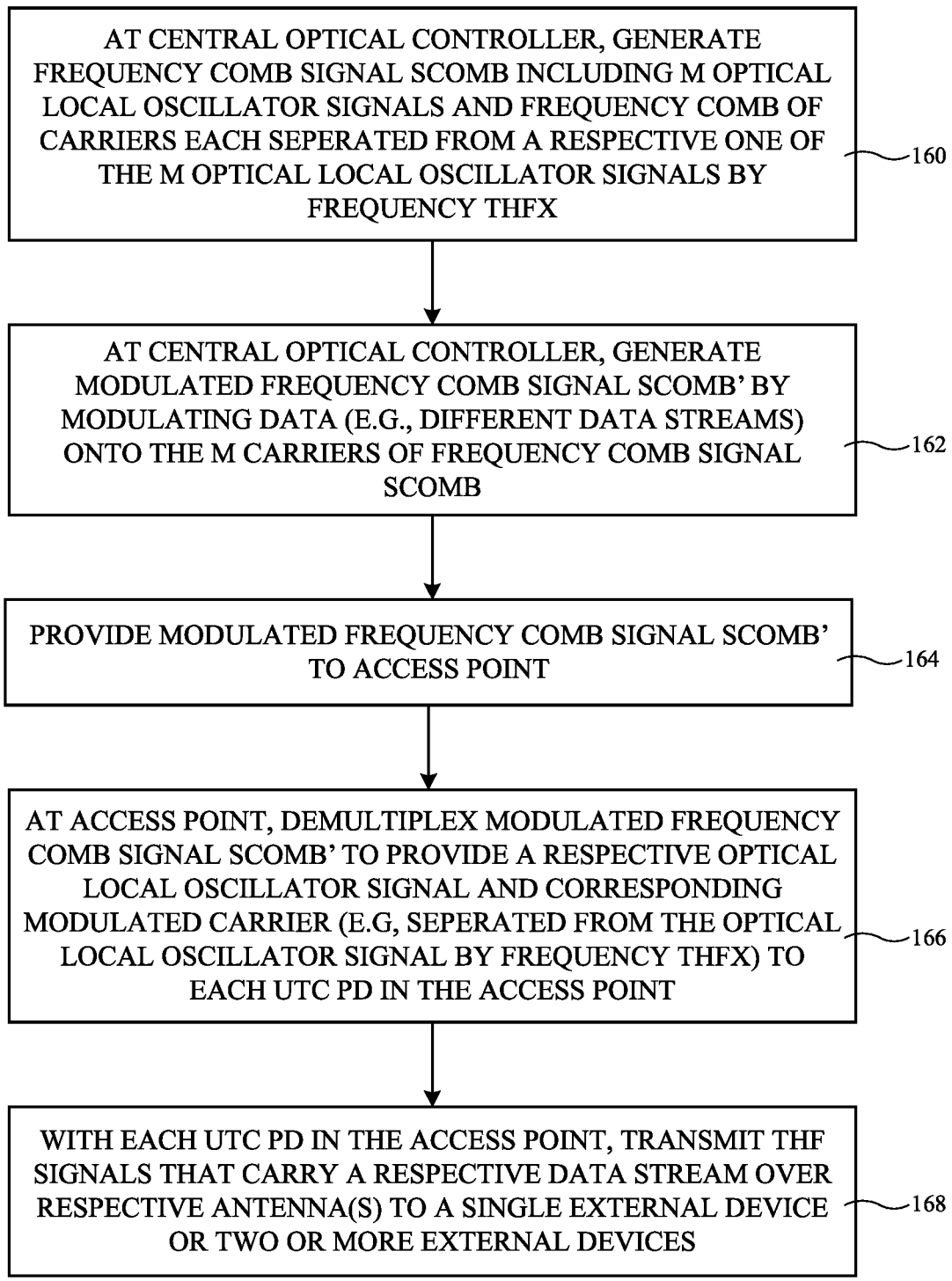
FIG. 13 is a flow chart of illustrative operations involved in using a single access point to transmit multiple streams of wireless signals at frequencies greater than about 100 GHz using an optical frequency comb signal in accordance with some embodiments.

FIG. 13 is a flow chart of illustrative operations involved in using a single access point 45 to transmit wireless signals at frequencies greater than about 100 GHz using multiple concurrent wireless streams (e.g., under an SU MIMO or MU MIMO scheme).

At operation 160, frequency comb generator 110 on central optical controller 90 may generate frequency comb signal scomb. Frequency comb generator 110 may include an optical frequency comb (e.g., set 122 of optical carriers 124 of FIG. 9) in frequency comb signal scomb. Frequency comb generator 110 may also include a set of optical LO signals 126 in frequency comb signal scomb. The set of optical LO signals 126 may include the same number of optical LO signals as there are carriers in the optical frequency comb. Each of the optical LO signals may be separated from one or two adjacent optical LO signals by the same frequency spacing (e.g., frequency $f_r$) as between the carriers 124 in the optical frequency comb. In this way, each optical LO signal may be separated from a respective carrier 124 in the optical frequency comb by the same frequency THFX (FIG. 12).

At operation 162, signal path 28 on central optical controller 90 may generate modulated frequency comb signal scomb' by modulating data (e.g., different data streams for concurrent transmission to the same external device 98 under an SU MIMO scheme or for concurrent transmission to multiple external devices 98 under an MU MIMO scheme) onto the carriers 124 in the optical frequency comb of frequency comb signal scomb.

At operation 164, central optical controller 90 may provide modulated frequency comb signal scomb' to access point 45 over optical path 140 (FIG. 12).

At operation 166, demultiplexer 150 (e.g., at access point 45) may demultiplex modulated frequency comb signal scomb' to provide a respective signal pair spair to each of the UTC PDs 42 in access point 45 over corresponding optical paths 152. Each signal pair spair may include a respective optical local oscillator signal 126 and a corresponding modulated carrier signal 128-1 separated from the optical local oscillator signal 126 by frequency THFX.

At operation 168, each UTC PD 42 in access point 45 may be illuminated by the respective signal pair spair provided by demultiplexer 150. This may cause each UTC PD 42 to transmit respective THF signals 142 at frequency THFX using the corresponding antennas 112. Each UTC PD 42 may transmit the THF signals concurrently to the same external device 98 or to multiple external devices 98. If desired, the operations of FIG. 10 may be modified to receive wireless data using access points 45. The operations of FIGS. 10 and 13 may be combined (e.g., central optical controller 90 may provide modulated frequency comb signals scomb' that perform both carrier aggregation and MIMO schemes. The optical components described herein (e.g., MZM modulator(s), waveguide(s), phase shifter(s), UTC PD(s), etc.) may be implemented in plasmonics technology if desired.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-13 (e.g., the operations of FIGS. 10 and 13) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A communication system comprising:
an optical signal generator configured to generate an optical local oscillator (LO) signal and an optical frequency comb that is offset in frequency from the optical LO signal;
an optical modulator configured to modulate wireless data onto the optical frequency comb;
an antenna radiating element;
a photodiode coupled to the antenna radiating element; and
an optical path configured to illuminate the photodiode with the optical LO signal and a portion of the optical frequency comb, the photodiode being configured to generate, based on the optical LO signal, the portion of the optical frequency comb, and a bias voltage applied to the photodiode, a current on the antenna radiating element that radiates wireless signals that include at least some of the wireless data.

2. The communication system of claim 1, wherein the optical frequency comb comprises a set of evenly spaced carriers that are modulated with the wireless data and the portion of the optical frequency comb comprises a carrier from the set of evenly spaced carriers.

3. The communication system of claim 2, further comprising:
an additional antenna radiating element;
an additional photodiode coupled to the additional antenna radiating element; and
an additional optical path configured to illuminate the additional photodiode with the optical LO signal and an additional carrier from the set of evenly spaced carriers, the additional photodiode being configured to generate, based on the optical LO signal, the additional carrier, and the bias voltage applied to the additional photodiode, an additional current on the additional antenna radiating element and having a different current than the current on the antenna radiating element, the additional current on the additional antenna radiating element being configured to radiate additional wireless signals that include at least some of the wireless data.

4. The communication system of claim 3, wherein the antenna radiating element is configured to transmit the wireless signals to a first external device and the additional antenna radiating element is configured to concurrently transmit the additional wireless signals to a second external device.

5. The communication system of claim 2, wherein the optical signal generator is configured to generate an additional optical LO signal that is offset in frequency from the optical LO signal by a frequency gap, further comprising:
an additional antenna radiating element;
an additional photodiode coupled to the additional antenna radiating element; and
an additional optical path configured to illuminate the additional photodiode with the additional optical LO signal and an additional carrier from the set of evenly spaced carriers, the additional carrier being separated in frequency from the carrier by the frequency gap and the additional photodiode being configured to generate, based on the additional optical LO signal, the additional carrier, and a bias voltage applied to the additional photodiode, an additional current on the additional antenna radiating element, the additional current on the additional antenna radiating element being configured to radiate additional wireless signals that include at least some of the wireless data.

6. The communication system of claim 5, wherein the antenna radiating element is configured to transmit the wireless signals to a first external device and the additional antenna radiating element is configured to concurrently transmit the additional wireless signals to a second external device that is spatially separated from the first external device.

7. The communication system of claim 5, wherein the antenna radiating element is configured to transmit the wireless signals to an external device and the additional antenna radiating element is configured to concurrently transmit the additional wireless signals to the external device.

8. The communication system of claim 1, further comprising:
a first housing, wherein the optical signal generator and the optical modulator are disposed in the first housing;
a second housing, wherein the photodiode, the optical path, and the antenna radiating element are disposed in the second housing; and
an optical fiber coupled between the first housing and the second housing.

9. The communication system of claim 1, further comprising:
an electronic device housing, wherein the optical signal generator, the optical modulator, the antenna radiating element, the photodiode, and the optical path are disposed in the electronic device housing.

10. A method of operating a communication system comprising:
generating, using an optical signal generator, a first optical local oscillator (LO) signal and a set of evenly spaced optical carriers that are offset from the first optical LO signal;
modulating, using an optical modulator, wireless data onto the set of evenly spaced optically carriers to produce a set of evenly spaced modulated optical carriers;
conveying, using an optical fiber, the first optical LO signal and the set of evenly spaced modulated optical carriers to an optical demultiplexer;
demultiplexing, using the optical demultiplexer, the set of evenly spaced modulated optical carriers and providing the first optical LO signal and a first modulated optical carrier from the set of evenly spaced modulated optical carriers to a first photodiode; and
transmitting, using the first photodiode, first wireless signals at a first frequency over a first antenna radiating element using the first optical LO signal and the first modulated optical carrier.

11. The method of claim 10, further comprising:
providing, using the optical demultiplexer, the first optical LO signal and a second modulated optical carrier from the set of evenly spaced modulated optical carriers to a second photodiode; and
transmitting, using the second photodiode, second wireless signals at a second frequency greater that is different from the first frequency over a second antenna radiating element using the first optical LO signal and the second modulated optical carrier concurrently with transmission of the first wireless signals by the first antenna radiating element.

12. The method of claim 11, wherein the first antenna radiating element is in a first phased antenna array and the second antenna radiating element is in a second phased antenna array, the method comprising:
directing, using the first phased antenna array, the first wireless signals towards a first external device; and
directing, using the second phased antenna array, the second wireless signals towards a second external device.

13. The method of claim 10, further comprising:
generating, using the optical signal generator, a second optical LO signal;
providing, using the optical demultiplexer, the second optical LO signal and a second modulated optical carrier from the set of evenly spaced modulated optical carriers to a second photodiode; and
transmitting, using the second photodiode, second wireless signals at the frequency over a second antenna radiating element using the second optical LO signal and the second modulated optical carrier concurrently with transmission of the first wireless signals by the first antenna radiating element.

14. The method of claim 13, wherein the second optical LO signal is offset from the first optical LO signal by a frequency gap and the second modulated optical carrier is offset from the first modulated optical carrier by the frequency gap.

15. The method of claim 13, wherein the first antenna radiating element is in a first phased antenna array and the second antenna radiating element is in a second phased antenna array, the method comprising:
directing, using the first phased antenna array, the first wireless signals towards a first external device; and
directing, using the second phased antenna array, directing the second wireless signals towards a second external device.

16. An electronic device comprising:
an optical signal generator configured to generate an optical local oscillator (LO) signal and a set of optical tones that are evenly spaced in frequency and that are offset in frequency from the optical LO signal, the set of optical tones having at least a first optical tone and a second optical tone;
a first photodiode coupled to a first antenna radiating element;
a second photodiode coupled to a second antenna radiating element; and
an optical splitter coupled to the optical signal generator through a first optical path, coupled to the first photodiode over a second optical path, and coupled to the second photodiode over a third optical path, the optical splitter being configured to transmit the optical LO signal and the first optical tone to the first photodiode and being configured to transmit the optical LO signal and the second optical tone to the second photodiode, the first photodiode and the first antenna radiating element being configured to convey first wireless signals at a first frequency greater using the optical LO signal and the first optical tone, and the second photodiode and the second antenna radiating element being configured to convey second wireless signals at a second frequency that is different from the first frequency using the optical LO signal and the second optical tone.

17. The electronic device of claim 16, wherein the first optical path comprises a first optical fiber, the second optical path comprises a second optical fiber, and the third optical path comprises a third optical fiber.

18. The electronic device of claim 17, further comprising:
an optical modulator coupled between the first optical fiber and the optical signal generator, wherein the optical modulator is configured to modulate the set of optical tones using wireless data.

19. The electronic device of claim 16, wherein the first optical tone is offset in frequency from the optical LO signal by the first frequency and the second optical tone is offset in frequency from the optical LO signal by the second frequency.

20. The electronic device of claim 16, wherein the first photodiode comprises a first uni-travelling-carrier photodiode (UTC PD) and the second photodiode comprises a second UTC PD.

\* \* \* \* \*